(12) United States Patent
Takemoto et al.

(10) Patent No.: US 11,375,254 B2
(45) Date of Patent: Jun. 28, 2022

(54) CONTROL APPARATUS

(71) Applicant: Funai Electric Co., Ltd., Osaka (JP)

(72) Inventors: Makoto Takemoto, Osaka (JP); Makoto Imagawa, Hyogo (JP); Shinichi Toge, Osaka (JP); Kanji Imanishi, Osaka (JP); Masatoshi Miyoshi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/450,703

(22) Filed: Mar. 6, 2017

(65) Prior Publication Data

US 2017/0272788 A1    Sep. 21, 2017

(30) Foreign Application Priority Data

Mar. 18, 2016 (JP) .............................. JP2016-055981

(51) Int. Cl.
| | |
|---|---|
| *H04N 21/2387* | (2011.01) |
| *H04N 21/44* | (2011.01) |
| *H04N 21/845* | (2011.01) |
| *H04N 21/436* | (2011.01) |
| *H04N 21/422* | (2011.01) |
| *H04N 21/41* | (2011.01) |

(Continued)

(52) U.S. Cl.
CPC ... *H04N 21/2387* (2013.01); *H04N 21/41265* (2020.08); *H04N 21/41407* (2013.01); *H04N 21/42204* (2013.01); *H04N 21/43615* (2013.01); *H04N 21/44* (2013.01); *H04N 21/44008* (2013.01); *H04N 21/47217* (2013.01); *H04N 21/8456* (2013.01)

(58) Field of Classification Search
CPC .............. H04N 21/2387; H04N 21/44; H04N 21/42204; H04N 21/43615; H04N 21/47217; H04N 21/44008; H04N 21/4126; H04N 21/41407; H04N 21/8456
See application file for complete search history.

(56) References Cited

U.S. PATENT DOCUMENTS

| | | | |
|---|---|---|---|
| 2009/0237569 A1* | 9/2009 | Saito | H04N 5/147 348/700 |
| 2011/0235993 A1* | 9/2011 | Zeng | G11B 27/28 386/241 |

(Continued)

FOREIGN PATENT DOCUMENTS

| | | |
|---|---|---|
| CN | 102568508 A | 7/2012 |
| CN | 102595237 A | 7/2012 |
| JP | 2004-040502 A | 2/2004 |

OTHER PUBLICATIONS

Extended European Search Report of the corresponding European Application No. 17160249.3, dated Aug. 17, 2017.

*Primary Examiner* — Benjamin R Bruckart
*Assistant Examiner* — Akshay Doshi
(74) *Attorney, Agent, or Firm* — Global IP Counselors, LLP

(57) ABSTRACT

A control apparatus is connected to a server device storing content and to a playback device, and controls playback of the content at the playback device. The control apparatus includes a receiver that receives the content from the server device, and a controller that transmits to the playback device information about a first playback position in the content received by the receiver.

20 Claims, 14 Drawing Sheets

(51) Int. Cl.
*H04N 21/414* (2011.01)
*H04N 21/472* (2011.01)

(56) References Cited

U.S. PATENT DOCUMENTS

| | | | |
|---|---|---|---|
| 2012/0131630 A1* | 5/2012 | Nozoe | H04N 21/8456 |
| | | | 725/117 |
| 2012/0180095 A1 | 7/2012 | Tanaka et al. | |
| 2013/0176491 A1* | 7/2013 | Kataoka | H04N 21/41265 |
| | | | 348/552 |
| 2013/0232528 A1* | 9/2013 | Hiroi | H04L 12/2812 |
| | | | 725/38 |
| 2014/0059597 A1* | 2/2014 | Issa | G06Q 30/0241 |
| | | | 725/36 |
| 2014/0362293 A1 | 12/2014 | Bakar et al. | |
| 2015/0061971 A1* | 3/2015 | Choi | G06F 3/1454 |
| | | | 345/2.3 |
| 2015/0143438 A1* | 5/2015 | Kwon | H04N 21/231 |
| | | | 725/94 |
| 2016/0094863 A1* | 3/2016 | Helferty | H04N 21/4383 |
| | | | 725/32 |
| 2017/0244770 A1* | 8/2017 | Eckerdal | G06F 16/639 |

* cited by examiner

CONTROL APPARATUS

CROSS-REFERENCE TO RELATED APPLICATIONS

This application claims priority to Japanese Patent Application No. 2016-055981 filed on Mar. 18, 2016. The entire disclosure of Japanese Patent Application No. 2016-055981 is hereby incorporated herein by reference.

BACKGROUND

Field of the Invention

The present invention generally relates to a control apparatus. More specifically, the present invention relates to a control apparatus that is connected via a communications network to a server device that has content and to a playback device that plays the content, and that controls playback of the content by the playback device.

Background Information

DLNA (Digital Living Network Alliance) guidelines are a known technique for distributing video content over a communications network. The DLNA guidelines define a content playback system (3-box system) that makes use of a digital media server (DMS), a digital media controller (DMC), and a digital media renderer (DMR).

With a content playback system such as this, the user can operate a DMC to control the playback of video content at a DMR (see Japanese Laid-Open Patent Application Publication No. 2004-040502 (Patent Literature 1), for example). For instance, the user operates the DMC to skip the playback of commercial messages (CM) included in the video content.

SUMMARY

There is a need for better efficiency in the control of such playback of video content via a communications network.

In view of this, the present invention provides a control apparatus with which playback of content via a communications network can be controlled effectively.

In view of the state of the known technology and in accordance with a first aspect of the present invention, a control apparatus is connected to a server device storing content and to a playback device, and controls playback of the content at the playback device. The control apparatus comprises a receiver, and a controller. The receiver receives the content from the server device. The controller transmits to the playback device information about a first playback position in the content received by the receiver.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. The embodiments described below are all inclusive or specific examples. The numerical values, shapes, materials, constituent elements, layout and connection modes of the constituent elements, steps, order of the steps, and so forth in the following embodiments are just examples, and are not intended to limit the claims. Of the constituent elements in the following embodiments, those that are not mentioned in an independent claim indicating a generic concept will be described as optional constituent elements.

First Embodiment

Configuration of Content Playback system

The configuration of the content playback system pertaining to a first embodiment will be described through reference to FIGS. 1 and 2.

Figure 1:
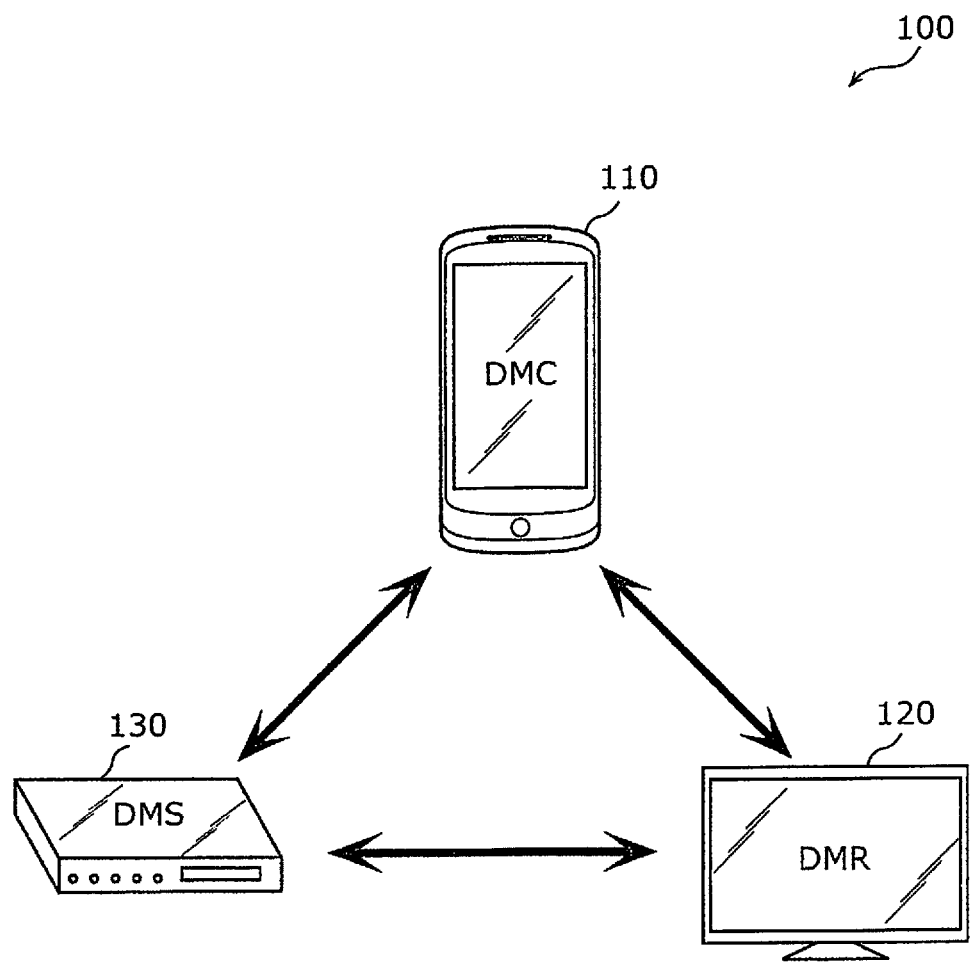
FIG. 1 is schematic diagram of a content playback system.
Figure 2:
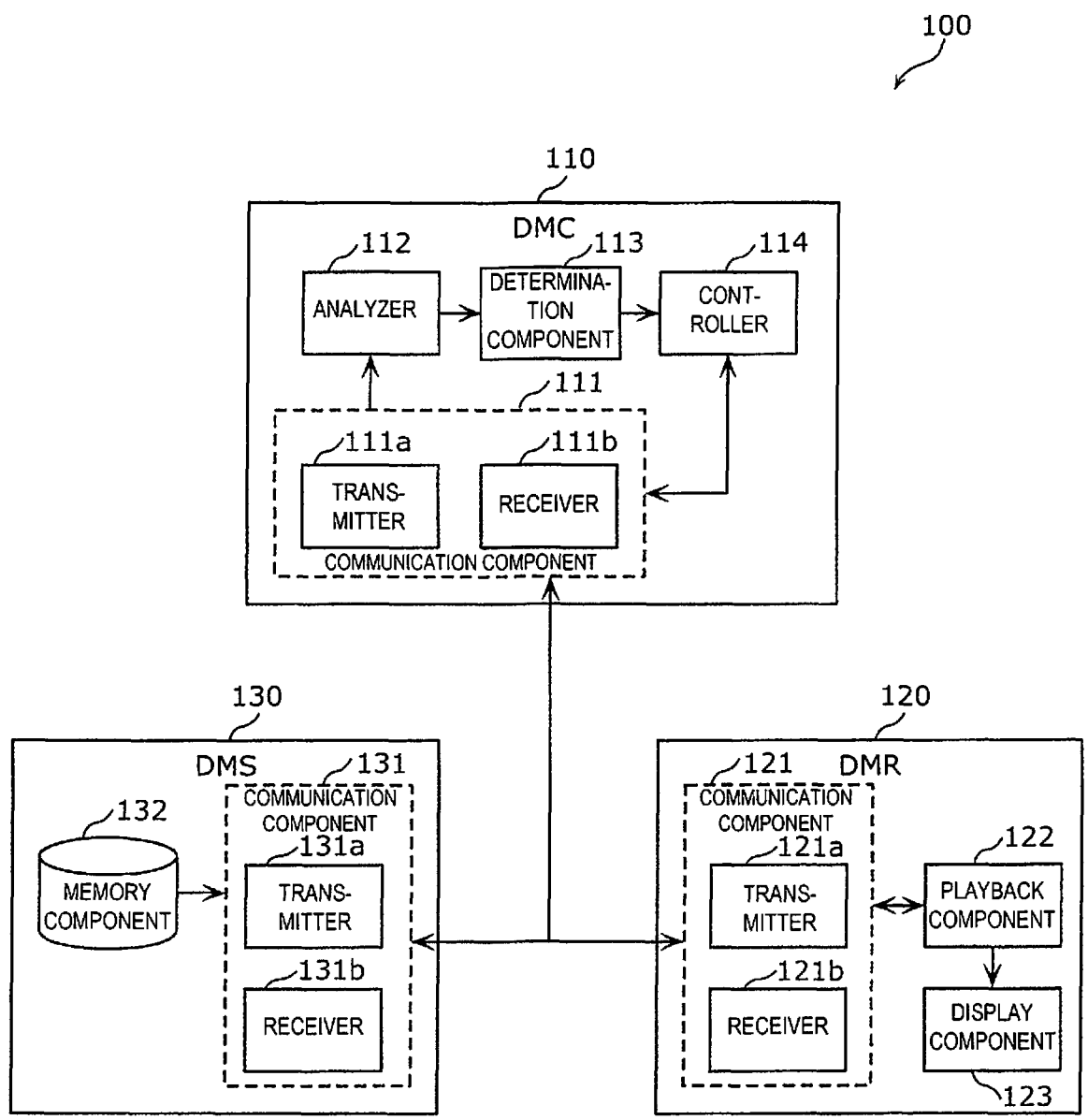
FIG. 2 is a block diagram of the functional configuration of the content playback system in a first embodiment.

FIG. 1 is concept diagram of a content playback system. FIG. 2 is a block diagram of the functional configuration of the content playback system in the first embodiment.

In this embodiment, a content playback system 100 is a system that conforms to DLNA guidelines, and comprises a DMC 110, a DMR 120, and a DMS 130. The DMC 110, the DMR 120, and the DMS 130 are connected to each other via a communications network (such as a LAN (local area network), WAN (wide area network), or PAN (personal area network)).

The detailed configuration of the various devices included in the content playback system 100 will now be described.

Configuration of DMC

First, we will describe the DMC 110. The DMC 110 is an example of a control apparatus that controls the playback of content at a playback device (here, the DMR 120). The following description is of a case in which the content is video content, but the content is not limited to being video content. "Video content" is content data including at least video, but video content can also include audio.

The DMC 110 is, for example, a smart phone, a tablet computer, or a personal computer. The DMC 110 comprises a communication component 111, an analyzer 112, a determination component 113, and a controller 114.

The communication component 111 comprises a transmitter 111a that transmits information to the DMR 120 and the DMS 130, and a receiver 111b that receives information from the DMR 120 and the DMS 130. For example, the communication component 111 is realized by a network adapter for communicating with devices on a communications network.

The transmitter 111a sends the DMR 120 an instruction to change the current playback position of video content according to an instruction from the controller 114. Also, the transmitter 111a can send the DMS 130 a request for video content.

The receiver 111b receives video content from the DMS 130 and outputs it to the analyzer 112. The receiver 111b also receives information about the current playback position of the video content from the DMR 120 and outputs it to the controller 114. The "current playback position" means the temporal position of a picture currently being played in the played video.

The analyzer 112 analyzes the video content received by the receiver 111b from the DMS 130, and outputs the analysis result to the determination component 113.

More specifically, the analyzer 112 analyzes at least one of video and audio of the video content to detect the positions of partition points (e.g., chapters) in the video content, and assigns or adds a first chapter and a second chapter to these positions. A chapter is information expressing a temporal partition point in the video. Here, the first chapter is a chapter located temporally ahead of the second chapter in the video content. Assigning or adding a chapter means determining the temporal position of a chapter, and marking the temporal position with a chapter or chapter mark. The analyzer 112 outputs information about the first chapter and second chapter to the determination component 113.

In this embodiment, the analyzer 112 detects a segment that satisfies a predetermined condition in the video content (hereinafter referred to as a specific segment). The analyzer 112 assigns the first chapter and second chapter to the start position and end position of the detected specific segment.

The predetermined condition is defined by the video and/or audio of the video content. For instance, a predetermined condition is a condition for detecting a CM segment included in video content. More specifically, a predetermined condition is defined, for example, by a silent segment, a scene change in the video, whether or not there is a mark in a certain image region within the video, or the like. Here, a segment in the content refers to a section of the content, and an adjacent pair of segments are partitioned by a partition point.

The determination component 113 uses the video content received by the receiver 111b from the DMS 130 to determine the first playback position of the video content. That is, the determination component 113 determines the first playback position based on the analysis result for video content produced by the analyzer 112. The first playback position indicates a temporal position within the video content.

In this embodiment, the determination component 113 determines the position of the second chapter assigned by the analyzer 112 as the first playback position. That is, the determination component 113 determines the first playback position to be the end position of a specific segment within the video content. The determination component 113 outputs the analysis result produced by the analyzer 112 and the determined first playback position to the controller 114.

The controller 114 moves the current playback position of the video content in the DMR 120 to the first playback position determined by the determination component 113. More specifically, the controller 114 sends the DMR 120 a control message to change the current playback position to the first playback position, via the transmitter 111a.

In this embodiment, the controller 114 automatically transmits the control message based on information about the current playback position received from the DMR 120. More specifically, when the current playback position of the video content in the DMR 120 has reached the position of the first chapter, the controller 114 moves the current playback position in the DMR 120 to the position of the second chapter (first playback position). That is, the controller 114 skips (does not play) the specific segment in the DMR 120.

Configuration of DMR

The DMR 120 will now be described. The DMR 120 is an example of a playback device that plays video content. The DMR 120 is a display, a television receiver, or the like. The DMR 120 comprises a communication component 121, a playback component 122, and a display component 123 (e.g., display).

The communication component 121 comprises a transmitter 121a that transmits information to the DMC 110 and the DMS 130, and a receiver 121b that receives information from the DMC 110 and the DMS 130. For example, the communication component 121 is realized by a network adapter for communicating with devices on a communications network.

The transmitter 121a sends the DMC 110 information about the current playback position of the video content.

The receiver 121b receives video content from the DMS 130 and outputs it to the playback component 122. The receiver 121b also receives instructions to change the playback position from the DMC 110, and outputs them to the playback component 122.

The playback component 122 plays the video content received from the DMS 130, and outputs it to the display component 123. The playback component 122 also changes the current playback position according to the playback position change instruction received from the DMC 110. In this embodiment, when the current playback position has reached the position of the first chapter, the playback component 122 moves the current playback position to the position of the second chapter according to the instruction to change the playback position received from the DMC 110.

The display component 123 displays the video content played by the playback component 122.

Configuration of DMS

Lastly, we will describe the DMS 130. The DMS 130 is an example of a server device having video content. The DMS 130 comprises, for example, a disk recorder or a home server. The DMS 130 comprises a communication component 131 and a memory component 132.

The communication component 131 comprises a transmitter 131a that transmits information to the DMC 110 and the DMR 120, and a receiver 131b that receives information from the DMC 110 and the DMR 120. For example, the communication component 131 is realized by a network adapter for communicating with devices on a communications network.

The transmitter 131a sends video content to the DMC 110 and the DMR 120. The transmitter 131a can also send the DMC 110 a list of one or more sets of video content that can be transmitted.

The receiver 131b receives requests for video content from the DMC 110 and the DMR 120.

The memory component 132 stores one or more sets of video content. The memory component 132 is realized by a hard disk drive, a semiconductor memory, or the like.

Operation of Content Playback system

Figure 3:
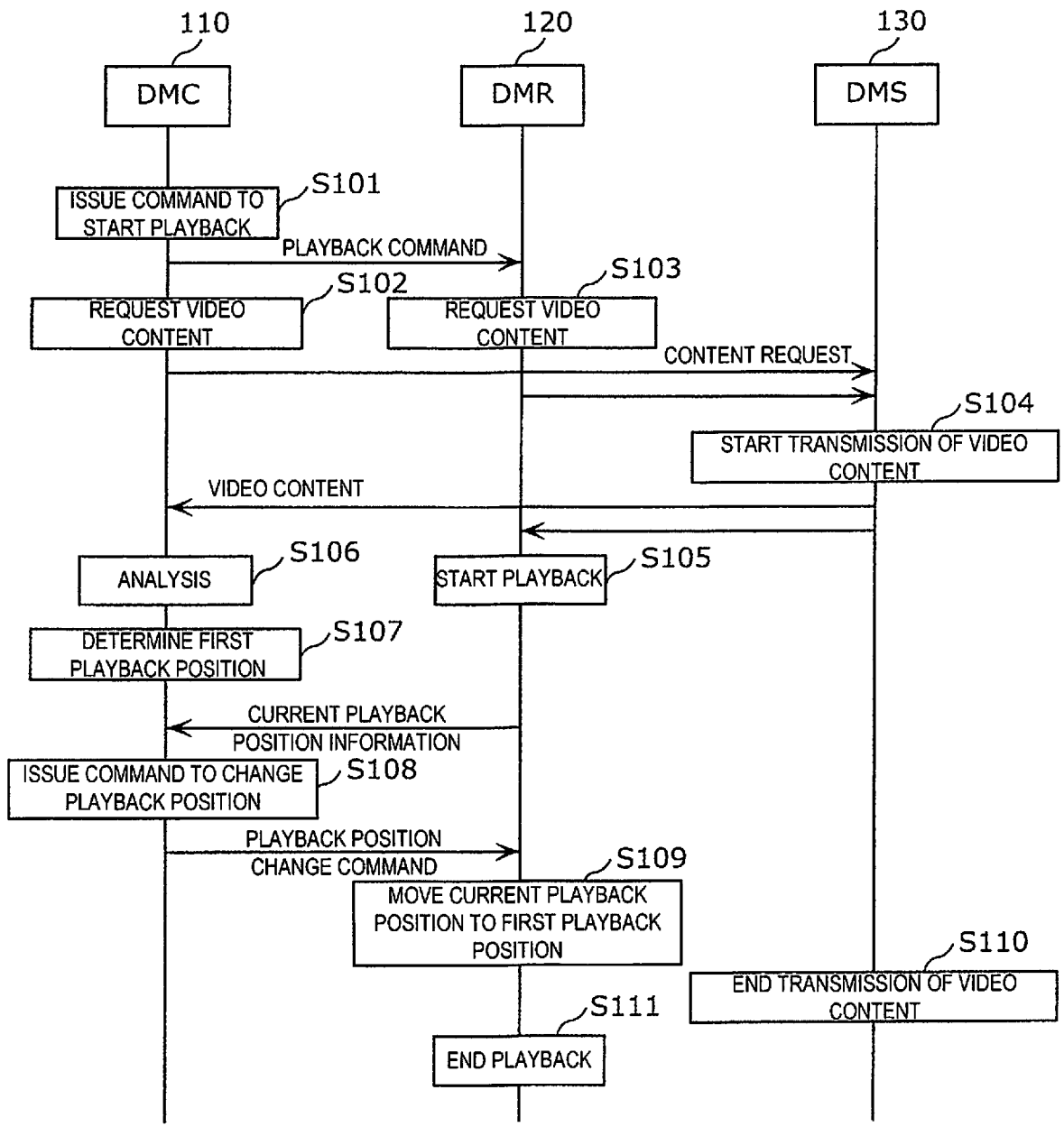
FIG. 3 is a sequence diagram of the operation of the content playback system in the first embodiment.

The operation of the content playback system 100 configured as above will now be described through reference to FIG. 3. FIG. 3 is a sequence diagram of the operation of the content playback system in the first embodiment.

First, the DMC 110 instructs the DMR 120 to begin playback of video content (S101). For example, the DMC 110 sends a control message (playback instruction) to play the video content selected by the user from the list of video content received from the DMS 130, through the transmitter 111a to the DMR 120.

The DMC 110 also requests of the DMS 130 the transmission of video content corresponding to the playback instruction to the DMR 120 (S102). More specifically, the DMC 110 sends a control message (content request) requesting the transmission of video content, through the transmitter 111a to the DMS 130.

Also, the DMR 120 requests of the DMS 130 the transmission of video content corresponding to the playback instruction from the DMC 110 (S103). More specifically, the DMR 120 sends a control message (content request) requesting the transmission of video content, through the transmitter 121a to the DMS 130.

In response to a content request, the DMS 130 starts the transmission of video content through the transmitter 131a to the DMC 110 and the DMR 120 (S104). More specifically, the DMS 130 sends a bit stream of video content to the DMC 110 and the DMR 120.

The playback component 122 of the DMR 120 starts playback of the video content received from the DMS 130 (S105). After this, the DMR 120 suitably sends the DMC 110 an event notification message indicating the current playback position, during the playback of the video content.

The analyzer 112 of the DMC 110 analyzes the video content received from the DMS 130 (S106). As a result, a first chapter and a second chapter are assigned to the start position and end position of the specific segment included in the video content. The determination component 113 of the DMC 110 determines the second chapter to be the first playback position (S107).

When the current playback position received from the DMR 120 has reached the position of the first chapter, the controller 114 of the DMC 110 moves the current playback position to the first playback position (the position of the second chapter) (S108). More specifically, the controller 114 sends a control message (playback position change instruction) to change the current playback position to the first playback position, through the transmitter 111a to the DMR 120.

The playback component 122 of the DMR 120 moves the current playback position to the first playback position according to the playback position change instruction (S109). For example, the playback component 122 of the DMR 120 sends a control message requesting the transmission of a bit stream from the first playback position, through the transmitter 121a to the DMS 130. The playback component 122 of the DMR 120 then plays the bit stream from the first playback position transmitted from the DMS 130, and thereby moves the current playback position to the first playback position.

After this, the DMS 130 ends the transmission of video content (S110). For example, the DMS 130 ends the transmission of video content once the bit stream of video content has been transmitted to the end. The playback component 122 of the DMR 120 ends the playback of the video content in conjunction with the end of transmission of video content (S111).

Operation of DMC

Figure 4:
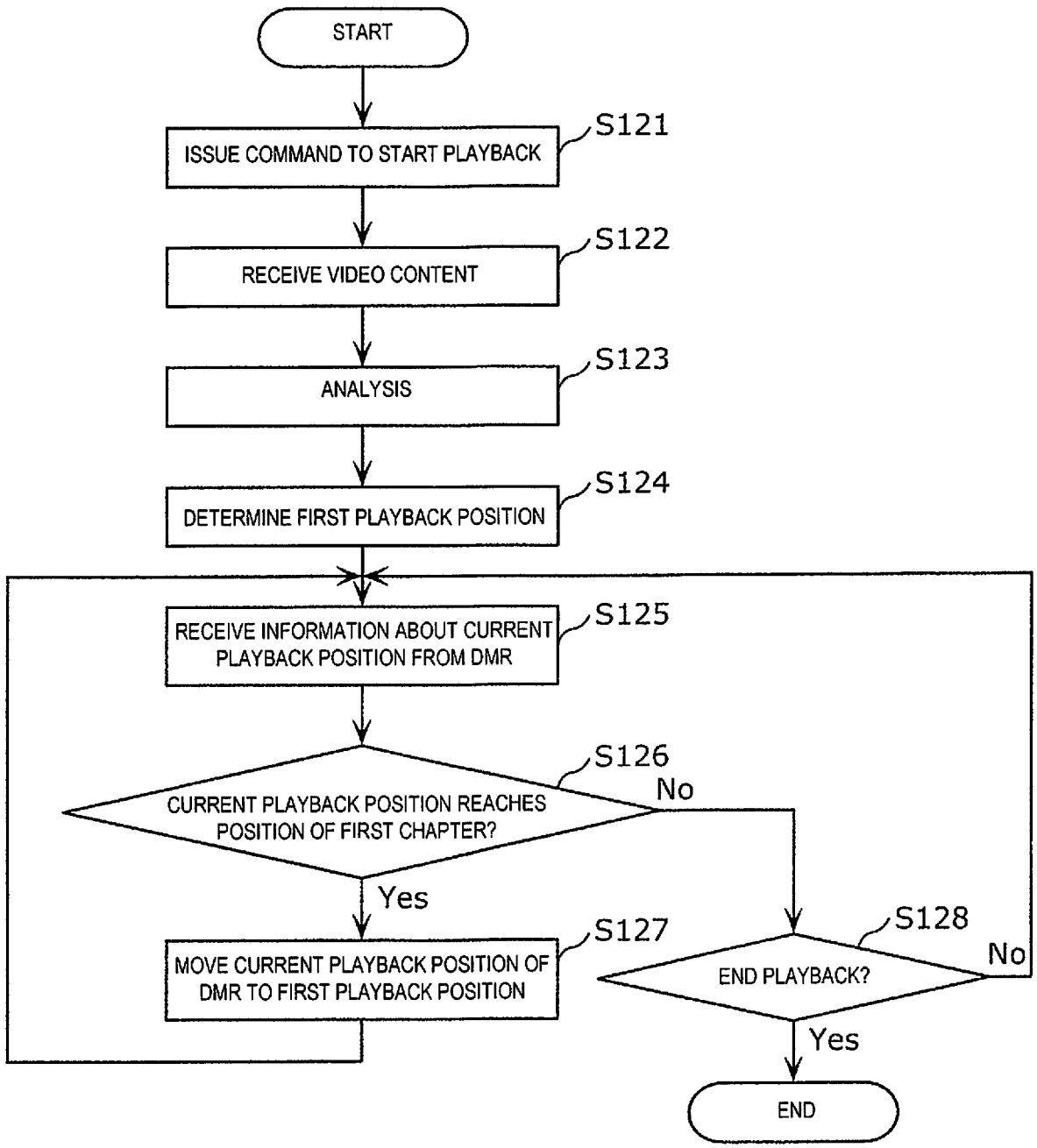
FIG. 4 is a flowchart of the operation of a DMC of the content playback system in the first embodiment.

The operation of the DMC 110 will now be described through reference to FIG. 4. FIG. 4 is a flowchart of the operation of the DMC in the first embodiment.

First, the controller 114 issues an instruction for the playback of the video content stored in the DMS 130 (S121). For example, the controller 114 sends the DMR 120 a control message including the address of the video content.

The receiver 111b receives the video content from the DMS 130 (S122). The analyzer 112 then analyzes the received video content, and assigns a first chapter and a second chapter to the video content (S123).

The determination component 113 determines the first playback position according to the analysis result (S124). More specifically, the determination component 113 determines the position of the second chapter to be the first playback position.

The receiver 111b receives information about the current playback position from the DMR 120 (S125).

The controller 114 determines whether or not the current playback position of the video content at the DMR 120 has reached the position of the first chapter (S126). For example, the controller 114 compares the timestamp indicating the current playback position with the timestamp indicating the first chapter, and determines that the current playback position has reached the position of the first chapter when the stamp indicating the position of the first chapter has gone past the timestamp indicating the current playback position.

Here, if the current playback position has reached the position of the first chapter (Yes in S126), the controller 114 moves the current playback position of the video content at the DMR 120 to the first playback position determined in step S124 (S127), and the flow returns to step S125.

On the other hand, if the current playback position has not reached the position of the first chapter (No in S126), the controller 114 determines whether or not the playback of the video content has end at the DMR 120 (S128). Here, if the playback of the video content has ended (Yes in S128), the processing is ended. On the other hand, if the playback of the video content has not ended (No in S128), the flow returns to step S125.

Effect

As discussed above, with the content playback system 100 pertaining to this embodiment, the DMC 110 can use the video content received from the DMS 130 to determine the first playback position, which is the destination playback position. Therefore, the DMC 110 can determined a first playback position that is suited to the video content, and the playback of video content over a communications network can be controlled effectively. In particular, since the DMC 110, and not the DMS 130, is what determines the first playback position, no special processing for determining the first playback position is requested of the DMS 130. Therefore, a mode of the present invention can be easily applied to a system that conforms to DLNA guidelines. Furthermore, since the DMR 120 does not determine the first playback position, the first playback position can be determined without any problem even if the processing capacity of the DMR 120 is low. Therefore, even when a television receiver or the like with low processing capacity is used for the DMR 120, the playback of video content at the DMR 120 can still be controlled effectively.

Also, with the content playback system 100 pertaining to this embodiment, the DMC 110 can analyze the video content and determine the first playback position based on this analysis result. Therefore, the DMC 110 can determine a first playback position that is better suited to the video content, and the playback of video content over a communications network can be controlled more effectively.

Also, with the content playback system 100 pertaining to this embodiment, when the current playback position of the video content at the DMR 120 has reached the position of the first chapter, the current playback position of the video content at the DMR 120 can be moved to the first playback position (the position of the second chapter). Therefore, the segment between the first chapter and the second chapter can be automatically skipped in the playback of the video content, and the playback of the video content at the DMR 120 can be controlled effectively.

Also, with the content playback system 100 pertaining to this embodiment, a first chapter and second chapter can be assigned to the start position and end position of a segment that satisfies a predetermined condition in the video content. Therefore, the segment that satisfies a predetermined condition can be automatically skipped in the playback of the video content, and the playback of video content at the DMR 120 can be controlled effectively.

In the illustrated embodiment, there is provided a control apparatus with which the playback of the content over the communications network can be controlled effectively. The DMS 130 having the content and the DMR 120 playing the content are connected via the communications network. The DMC 110 that controls the playback of the content at the DMR 120 comprises the receiver 111b that receives the content from the DMS 130, and the controller 114 that transmits to the DMR 120 the information about the first playback position in the content received by the receiver 111b.

Second Embodiment

A second embodiment will now be described. The second embodiment differs from the first embodiment mainly in that the first playback position is determined based on a user operation. The following description of the second embodiment will focus on this difference from the first embodiment.

Configuration of Content Playback system

The configuration of the content playback system pertaining to the second embodiment will be described through reference to FIG. 5.

Figure 5:
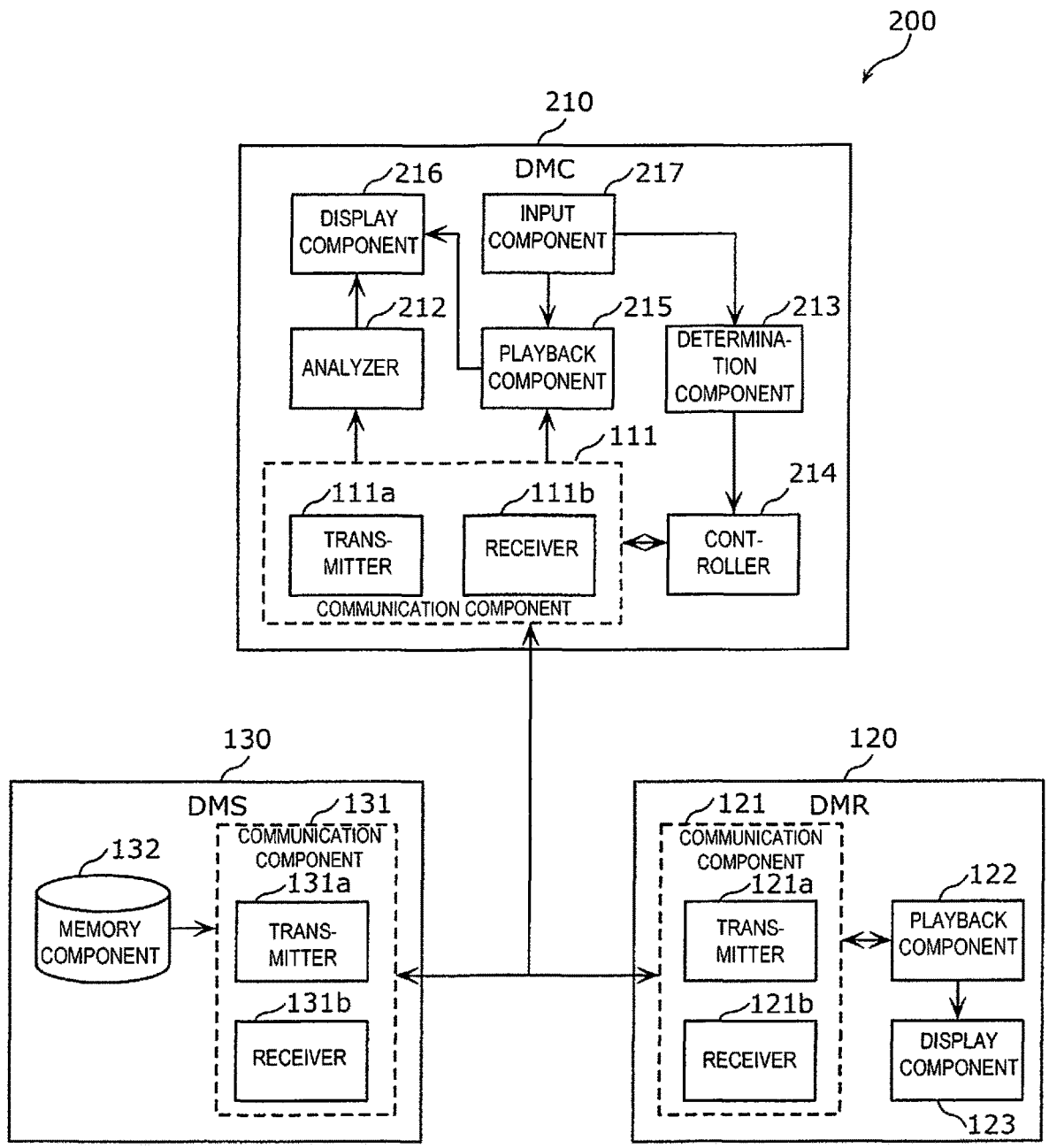
FIG. 5 is a block diagram of the functional configuration of a content playback system in a second embodiment.

FIG. 5 is a block diagram of the functional configuration of the content playback system in the second embodiment. In FIG. 5, those components that are the same as or similar to those in FIG. 2 are numbered the same and may not be described again.

In this embodiment, a content playback system 200 is a system that conforms to DLNA guidelines just as in the first embodiment, and comprises a DMC 210, the DMR 120, and the DMS 130, which are connected to each other via a communications network.

The detailed configuration of the DMC 210 included in the content playback system 200 will now described below.

Configuration of DMC

The DMC 210 is an example of a control apparatus that controls the playback of video content in a playback device (the DMR 120 here). The DMC 210 is, for example, a smart phone, a tablet computer, or a personal computer. The DMC 210 comprises the communication component 111, an analyzer 212, an input component 217, a playback component 215, a display component 216 (e.g., display), a determination component 213, and a controller 214.

The analyzer 212 analyzes the video content received by the receiver 111b from the DMS 130, and thereby assigns one or more chapters to the video content. For example, just as in the first embodiment, the analyzer 212 can detect a specific segment within the video content, and assign chapters to the start position and end position of the detected specific segment.

Also, for example, the analyzer 212 can detect the position in the video content where video switches to audio, and assign a chapter to the detected position. There are no particular restrictions on how the position where the video switches is detected, and any conventional scene change detection method can be used.

Also, for example, the analyzer 212 can assign chapters periodically at a predetermined specific time interval. This specific time interval can be any time interval, and can be set according to input from the user, for example.

The input component 217 is, for example, a touch display, a mouse, or another such input device, and accepts user operations to designate the second playback position within the video content. The second playback position indicates a temporal position within the video content. For example, the input component 217 accepts the designation of one chapter from the user based on information about one or more chapters displayed by the display component 216 (discussed below). In this case, the second playback position is the position of the one chapter designated by the user.

The playback component 215 plays the video content from the second playback position designated by the user through the input component 217, and outputs the played video content to the display component 216.

The display component 216 is, for example, a touch display or another such display device, and displays the video content played from the second playback position by the playback component 215. Also, the display component 216 displays information about the one or more chapters assigned by the analyzer 212. For instance, the display component 216 displays one or more marks indicating the temporal position of one or more chapters. Also, for example, the display component 216 can display thumbnail images of one or more chapters.

The determination component 213 determines the first playback position based on the video content played from the second playback position by the playback component 215. For example, the determination component 213 determines either the current playback position of the video content produced by the playback component 215, or the second playback position designated by the user through the input component 217, to be the first playback position.

The controller 214 moves the current playback position of the video content at the DMR 120 to the first playback position determined by the determination component 213. More specifically, just as in the first embodiment, the controller 214 sends the DMR 120 a control message for changing the current playback position to the first playback position through the transmitter 111a.

Operation of Content Playback system

Figure 6:
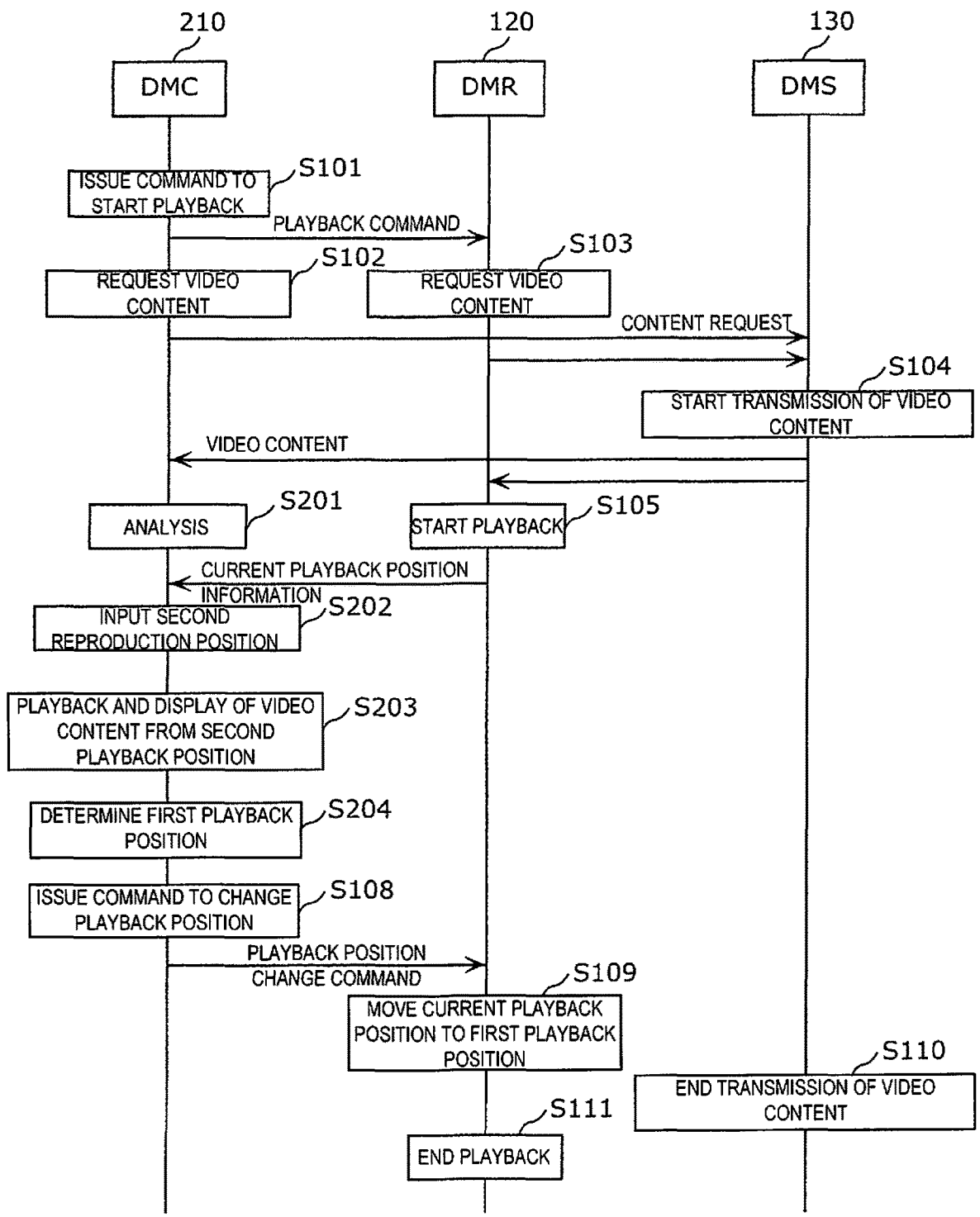
FIG. 6 is a sequence diagram of the operation of the content playback system in the second embodiment.

The operation of the content playback system 200 configured as above will now be described through reference to FIG. 6. FIG. 6 is a sequence diagram of the operation of the content playback system in the second embodiment. In FIG. 6, those steps that are the same as or similar to those in FIG. 3 are numbered the same and may not be described again.

After the transmission of video content by the DMS 130 has begun (S104), the analyzer 212 of the DMC 210 analyzes the video content received from the DMS 130 (S201). As a result, one or more chapters are assigned to the video content.

The input component 217 of the DMC 210 receives user input of the second playback position (S202). The playback component 215 of the DMC 210 plays the video content from the second playback position, and the display component 216 displays the played video content (S203).

The determination component 213 of the DMC 210 determines the first playback position based on the video content displayed on the display component 216 (S204).

Operation of DMC

Figure 7:
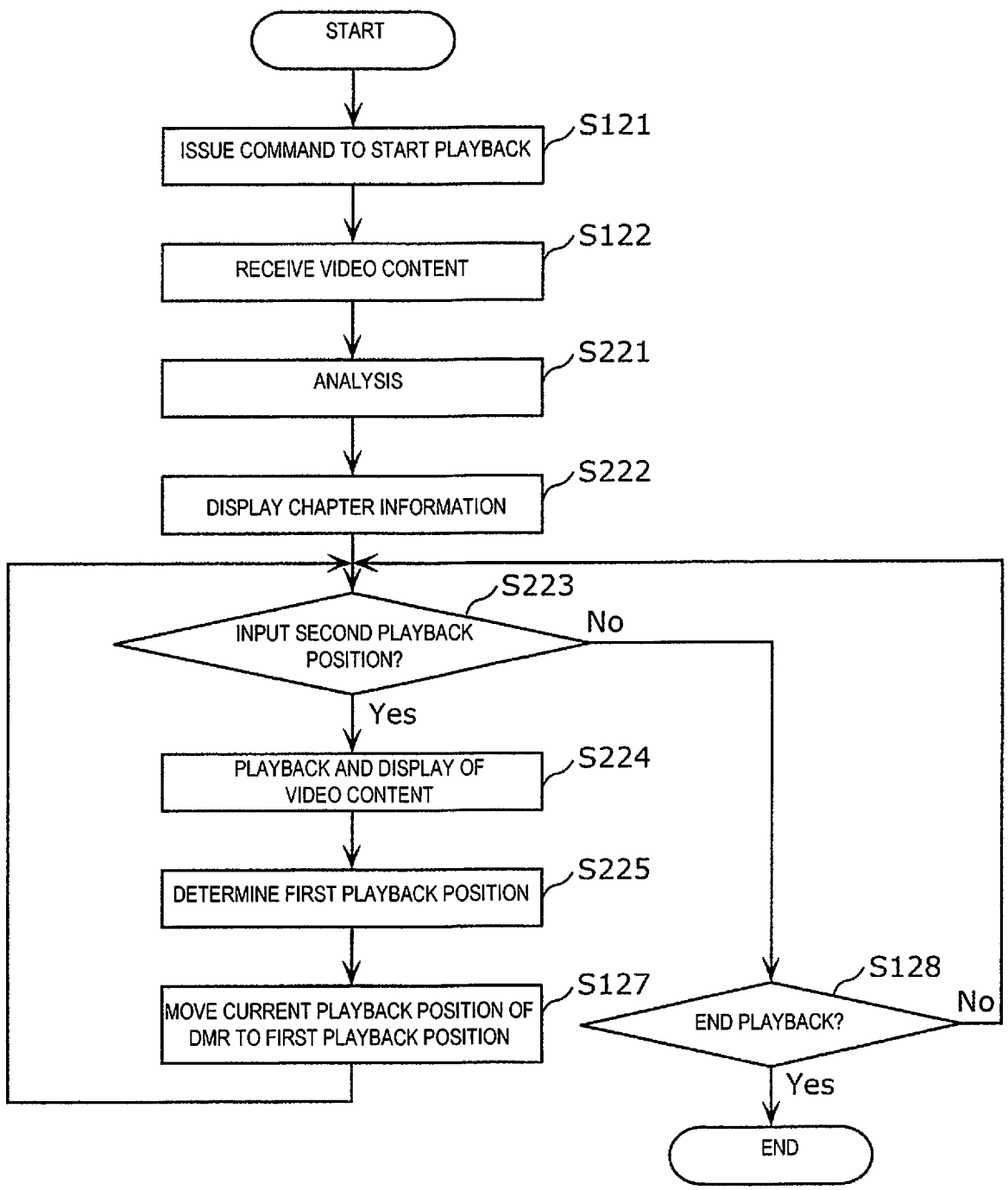
FIG. 7 is a flowchart of the operation of a DMC of the content playback system in the second embodiment.

The operation of the DMC 210 will now be described through reference to FIGS. 7 to 9. FIG. 7 is a flowchart of the operation of the DMC in the second embodiment. In FIG. 7, those steps that are the same as or similar to those in FIG. 4 are numbered the same and may not be described again.

After the video content has been received by the receiver 111b from the DMS 130 (S122), the analyzer 212 analyzes the video content to assign one or more chapters to the video content (S221). In this embodiment, a chapter is used as information for supporting user input. Therefore, the position of a chapter is not necessarily limited to the start position and end position of a specific segment, such as a CM.

The display component 216 displays information about chapters assigned in step S221 (S222). As shown in FIG. 8, the display component 216 displays information about chapters at corresponding positions on a slider.

Figure 8:
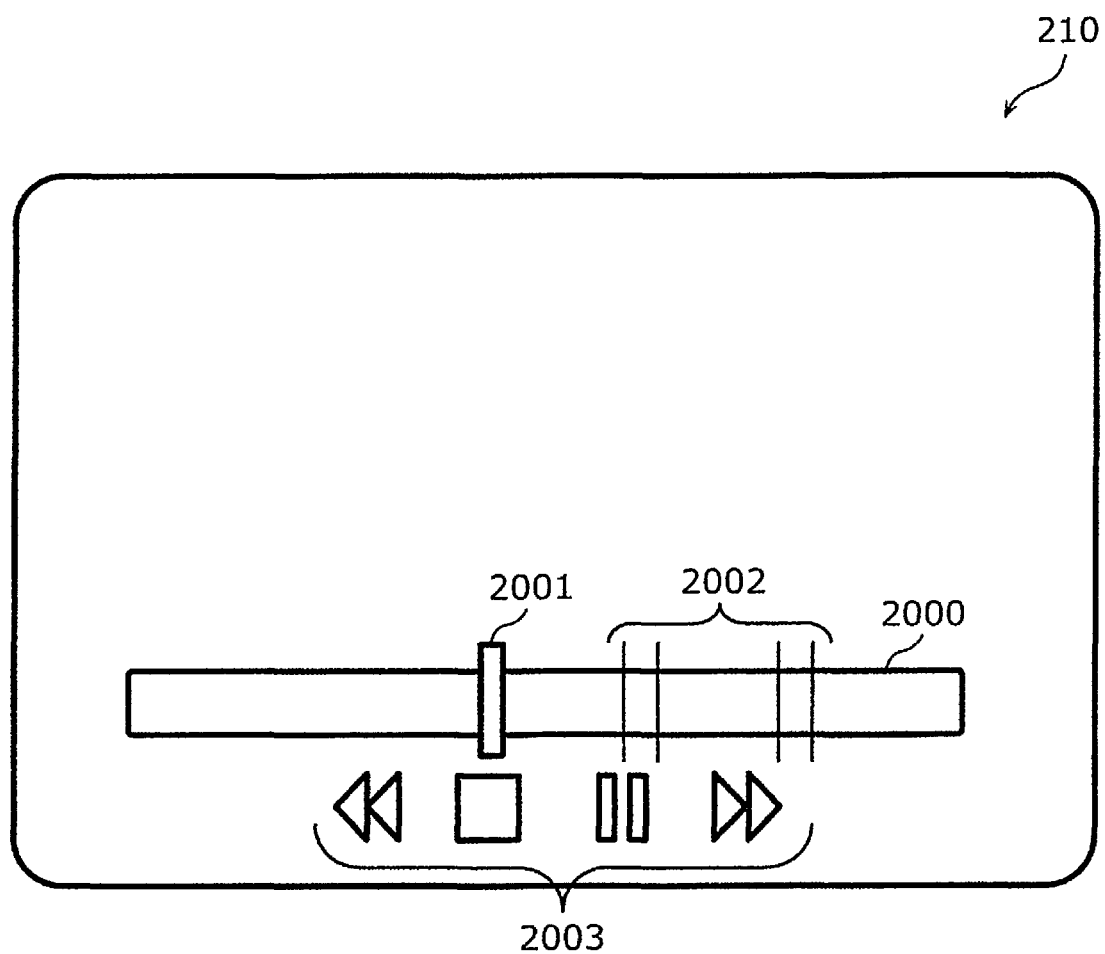
FIG. 8 shows an example of a graphical user interface that displays chapter information in the second embodiment.

FIG. 8 shows an example of a graphical user interface (GUI) that displays chapter information in the second embodiment. In FIG. 8, the display component 216 displays a slider 2000 and a playback controller 2003.

The slider 2000 is a GUI element having an indicator that can move linearly, and is also called a seek bar. The slider 2000 includes an indicator 2001 that indicates the current playback position of video content at the DMR 120, and four chapter marks 2002 that indicate the positions of four chapters. The user refers to the four chapter marks 2002 and moves the indicator 2001, thereby designating the position of the indicator 2001 after this movement as the second playback position. That is, an operation to designate the second playback position is an operation to move the indicator 2001 to a position corresponding to the second playback position on the slider 2000.

The playback controller 2003 is a GUI component for controlling the playback of video content at the DMC 110. The user can use the playback controller 2003 to control the playback (fast forward, rewind, pause, etc.) of video content displayed on the display component 216.

The controller 214 determines whether or not the input component 217 has received input of the second playback position from the user (S223). Here, if the input component 217 has received input of the second playback position from the user (Yes in S223), the playback component 215 plays the video content from the second playback position, and the display component 216 displays the played video content (S224).

Figure 9:
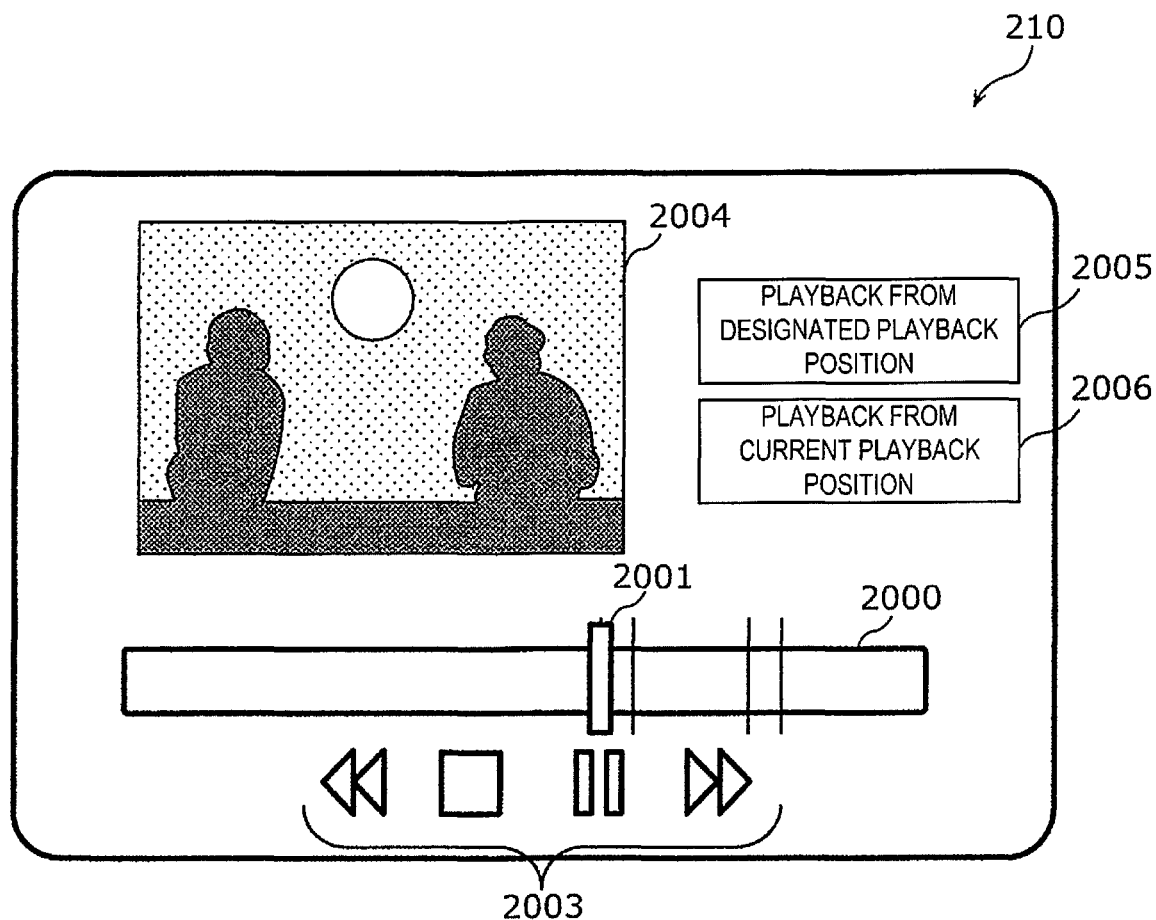
FIG. 9 shows an example of the display of video content played from a second playback position in the second embodiment.

FIG. 9 shows an example of the display of video content played from the second playback position in the second embodiment. In FIG. 9, the display component 216 is displaying video content 2004 played from the second playback position. Also, the display component 216 displays a first button 2005 for selecting the second playback position designated by the user through the input component 217, and a second button 2006 for selecting the current playback position of the video content produced by the playback component 215. The user looks at the video content played from the second playback position by the DMC 210, and operates either the first button 2005 or the second button 2006. As a result, the input component 217 accepts a user operation to select between the second playback position and the current playback position of the video content produced by the playback component 215.

The determination component 213 determines either the current playback position of the video content produced by the playback component 215 or the second playback position selected through the input component 217 by user operation to be the first playback position (S225). The controller 214 moves the current playback position of the video content at the DMR 120 to the first playback position determined in step S225 (S127), and the flow returns to step S223.

On the other hand, if the input component 217 has not received the input of the second playback position from the user (No in S223), the controller 214 determines whether or not the playback of video content has ended at the DMR 120 (S128). Here, if the playback of video content has ended (Yes in S128), processing is ended. If, however, the playback of video content has not ended (No in S128), the flow returns to step S223.

Effect

As discussed above, with the content playback system 200 pertaining to this embodiment, the display component 216 of the DMC 210 can display the video content played from the second playback position, and the first playback position can be determined based on this video content. Therefore, the user can determine the first playback position while looking at the video content displayed on the DMC 210. That is, the user does not have to look at both the DMC 210 and the DMR 120, and can determine the first playback position with the DMC 210 alone. Therefore, user convenience is improved, and the playback of video content at the DMR 120 can be controlled effectively.

Also, with the content playback system 200 pertaining to this embodiment, information about one or more chapters assigned by the analyzer 212 can be displayed. Therefore, the user can look at the displayed information about the one or more chapters to designate the proper second playback position, which improves user convenience.

Also, with the content playback system 200 pertaining to this embodiment, chapters can be assigned to the start position and end position of a segment that satisfies a predetermined condition within the video content. A chapter can also be assigned to the position in the video content where the video or audio switches. Chapters can also be assigned periodically at a predetermined time interval. Therefore, the user can look at chapter information and thereby designate the second playback position properly, and the playback of video content at the DMR 120 can be controlled effectively.

Also, with the content playback system 200 pertaining to this embodiment, the second playback position can be designated by moving a position indicator corresponding to the second playback position on a slider. Therefore, the second playback position can be easily designated.

Also, with the DMC 210 pertaining to this embodiment, either the second playback position or the current playback position of the video content produced by the playback component 215, whichever is selected, can be determined to be the first playback position. Therefore, the user can determine the first playback position according to the video content played from the second playback position, and the playback of video content at the DMR 120 can be controlled effectively.

Modification Example of the Second Embodiment

In the second embodiment above, a slider is used to designate the second playback position, but the GUI is not limited to this. For example, a thumbnail image of a chapter can be used to designate the second playback position.

Figure 10:
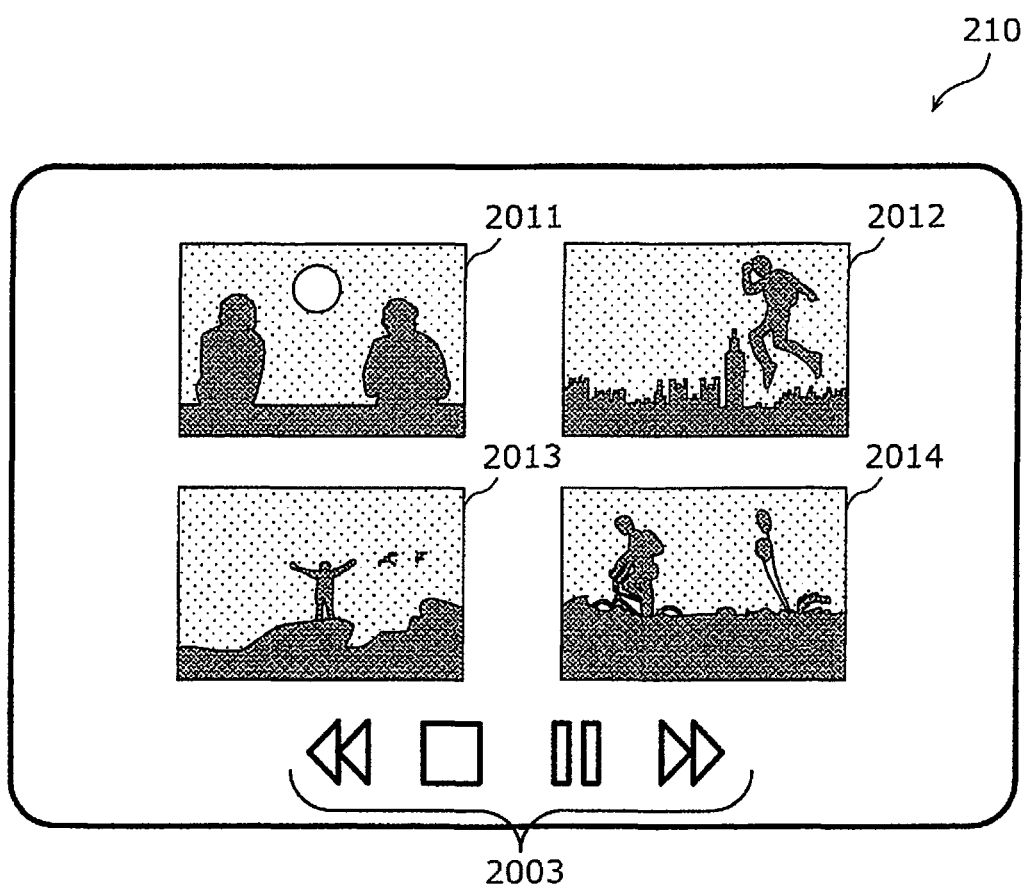
FIG. 10 shows an example of a graphical user interface that displays chapter information in a modification example of the second embodiment.

FIG. 10 shows an example of a GUI that displays chapter information in a modification example of the second embodiment. In FIG. 10, chapter information is a thumbnail image corresponding to a chapter. A thumbnail image corresponding to a chapter is a sample image of the video content at the position of the chapter.

Here, the display component 216 displays a first thumbnail image 2011 corresponding to a first chapter, a second thumbnail image 2012 corresponding to a second chapter, a third thumbnail image 2013 corresponding to a third chapter, and a fourth thumbnail image 2014 corresponding to a fourth chapter. These thumbnail images are produced by the analyzer 212.

The user operates one of the first to fourth thumbnail images 2011 to 2014 and thereby designates one of the first to fourth thumbnail images 2011 to 2014. Here, for example, when there is a user operation to designate the first thumbnail image 2011, the position of the first chapter is determined to be the second playback position, and there is a transition to the screen shown in FIG. 11.

Figure 11:
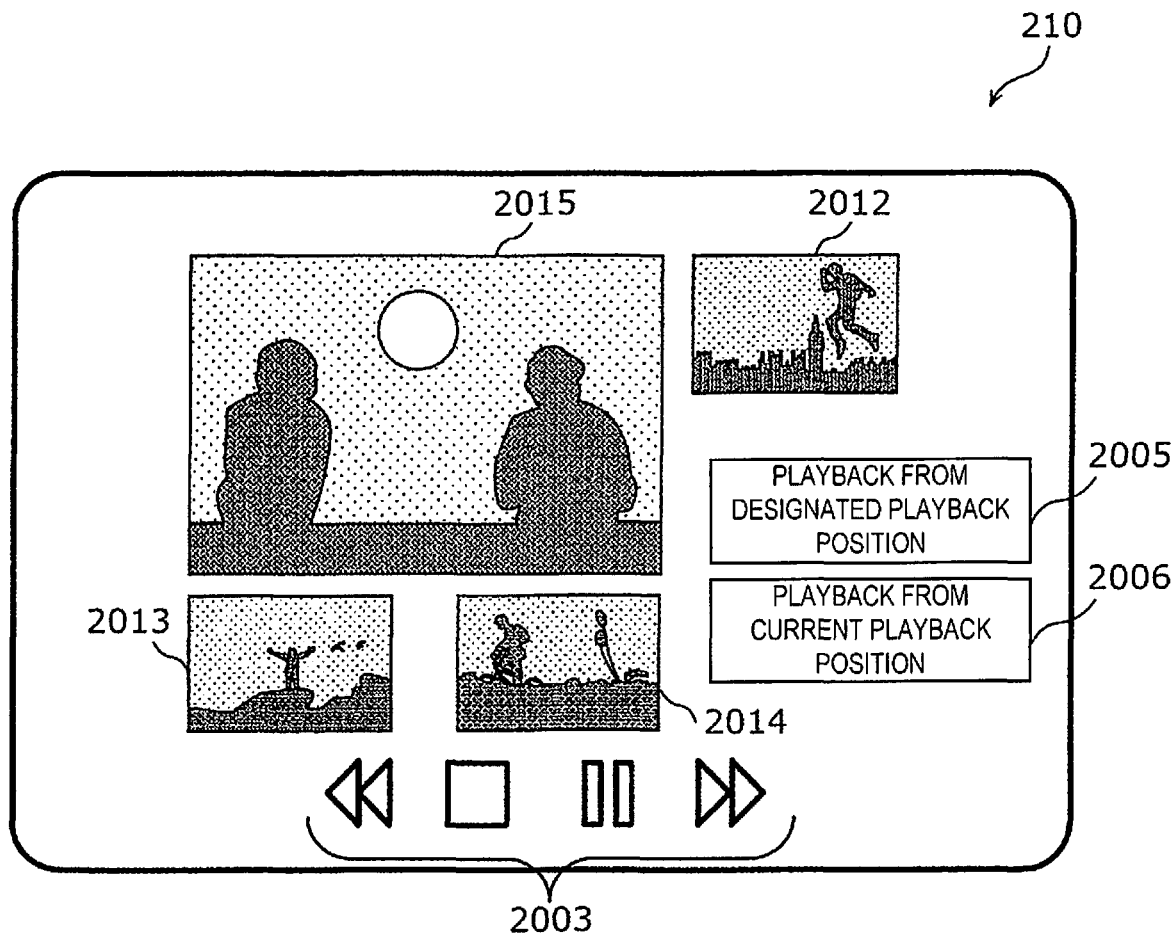
FIG. 11 shows an example of the display of video content played from a second playback position in a modification example of the second embodiment.

FIG. 11 shows an example of the display of video content played from the second playback position in a modification example of the second embodiment. In FIG. 11, the display component 216 displays the video content 2015 played from the second playback position by the playback component 215, in a region that is larger than the display region of the first thumbnail image 2011 shown in FIG. 10. The display component 216 also shrinks the display regions of the second to fourth thumbnail images 2012 to 2014.

Effect

With the content playback system 200 pertaining to this modification example, one or more thumbnail images corresponding to one or more chapters can be displayed. Therefore, the user can easily designate the second playback position based on the one or more thumbnail images that are displayed.

Also, with the content playback system 200 pertaining to this embodiment, when there is a user operation to designate a first thumbnail image, the video content played from the second playback position can be displayed by the playback component 215 in a region that is larger than the display region of the first thumbnail image, and the display region of the second thumbnail image can be made smaller. Therefore, the played video content can be displayed large, which makes the video content easier to view.

Third Embodiment

A third embodiment will now be described. The third embodiment differs from the embodiments given above in that the same video content is played with synchronization by the DMC and the DMR. The third embodiment will be described below by focusing on the differences from the first and second embodiments.

Configuration of Content Playback system

The configuration of the content playback system pertaining to the third embodiment will be described through reference to FIG. 12.

Figure 12:
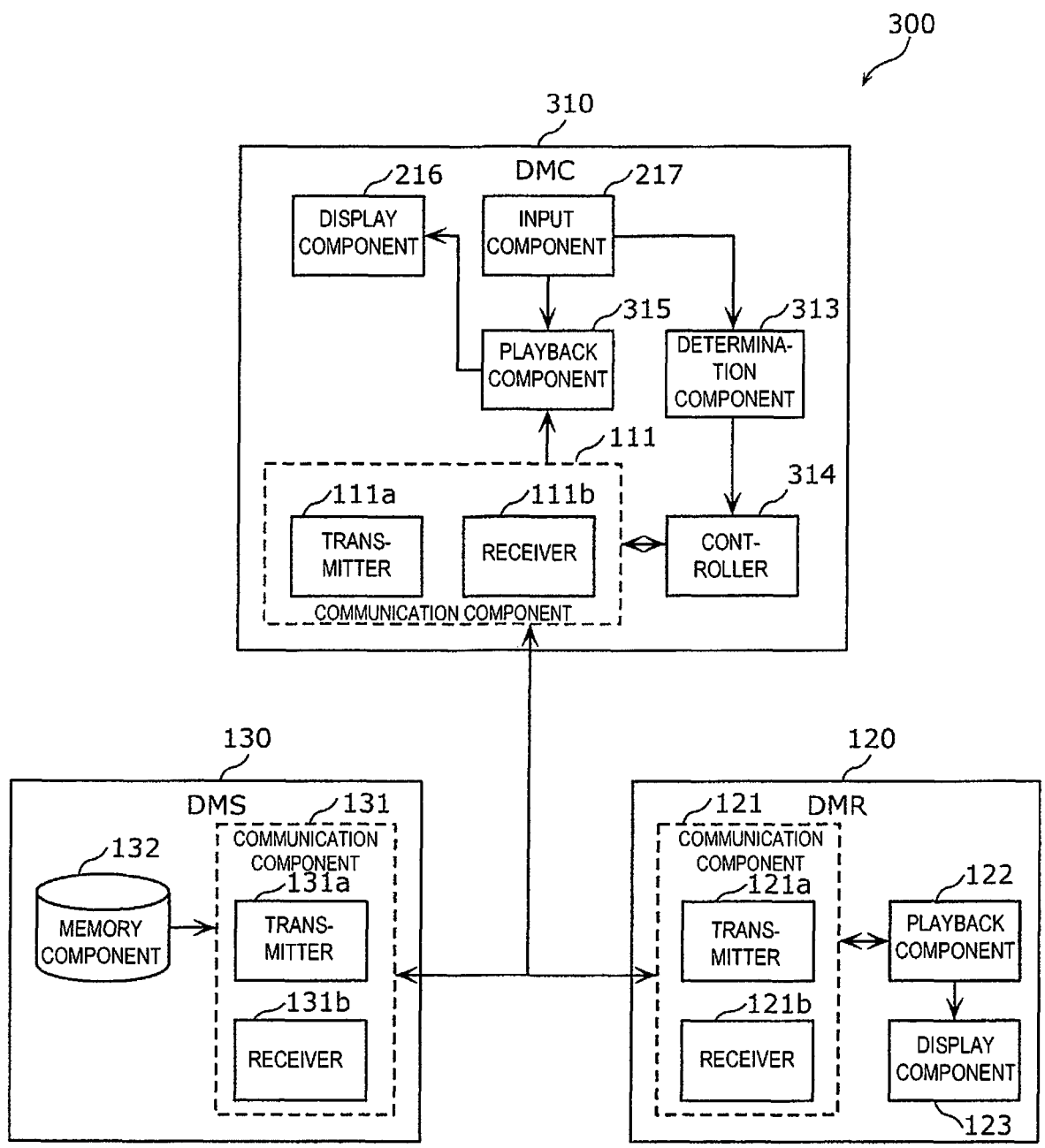
FIG. 12 is a block diagram of the functional configuration of a content playback system in a third embodiment.

FIG. 12 is a block diagram of the functional configuration of the content playback system in the third embodiment. In FIG. 12, those components that are the same as or similar to those in FIG. 2 or FIG. 5 are numbered the same and may not be described again.

In this embodiment, a content playback system 300 is a system that conforms to DLNA guidelines, just as in the first and second embodiments, and comprises a DMC 310, the DMR 120, and the DMS 130, which are connected to each other via a communications network.

The detailed configuration of the DMC 310 included in the content playback system 300 will now be described.

Configuration of DMC

The DMC 310 is an example of a control apparatus that controls the playback of video content in a playback device (here, the DMR 120). The DMC 310 is, for example, a smart phone, a tablet computer, or a personal computer. The DMC 310 comprises the communication component 111, the input component 217, a playback component 315, the display component 216, a determination component 313, and a controller 314.

The playback component 315 plays the video content received from the DMS 130. At this point the playback of video content at the playback component 315 is synchronized with the playback of video content at the DMR 120 by playing the video content under the control of the controller 314.

Also, the playback component 315 can play video or audio that is different from the video or audio played at the DMR 120. For instance, if the video content includes first audio in a first language and second audio in a second language, the DMR 120 can play the first audio and the playback component 315 of the DMC 310 can play the second audio.

Also, for example, if the video content is multiview video content that includes first video in a first view and second video in a second view, the DMR 120 can play the first video and the playback component 315 of the DMC 310 can play the second video.

The controller 314 synchronizes the playback of video content at the DMR 120 with the playback of video content by the playback component 315. For example, the controller 314 controls the DMR 120 based on information about the current playback position at the playback component 315, thereby synchronizing the playback of video content at the DMR 120 with the playback of video content by the playback component 315. For instance, if the second playback position (see SECOND EMBODIMENT) is inputted by the user through the input component 217, the controller 314 moves the current playback position at the playback component 315 to this first playback position, and moves the current playback position at the DMR 120 to this first playback position.

The determination component 313 determines the first playback position based on the video content played by the playback component 315. For example, the determination component 313 determines the second playback position designated by the user through the input component 217 to be the first playback position.

Effect

As discussed above, with the content playback system 300 pertaining to this embodiment, the playback of video content at the DMR 120 can be synchronized with the playback of video content by the playback component 315 of the DMC 310. Therefore, the user can determine the first playback position while looking at the video content displayed at the DMC 310. That is, the user can determine the first playback position with just the DMC 310, without having to look at both the DMC 310 and the DMR 120. Therefore, user convenience is improved, and the playback of video content at the DMR 120 can be controlled effectively.

Also, with the content playback system 300 pertaining to this embodiment, first audio in a first language can be played by the DMR 120, and second audio in a second language can be played by the DMC 310. Therefore, the viewer of the DMR 120 and the user of the DMC 310 can listen to audio in different languages, which improves user convenience.

Also, with the content playback system 300 pertaining to this embodiment, first video in a first view can be played by the DMR 120, and second video in a second view can be played by the DMC 310. Therefore, the viewer of the DMR 120 and the user of the DMC 310 can watch video in different views, which improves user convenience.

Fourth Embodiment

A fourth embodiment will now be described. The fourth embodiment differs from the first embodiment mainly in that analysis of the video content is done by distributed processing. The fourth embodiment will be described below by focusing on the differences from the first embodiment.

Configuration of Content Playback system

The configuration of the content playback system pertaining to the fourth embodiment will be described through reference to FIG. 13.

Figure 13:
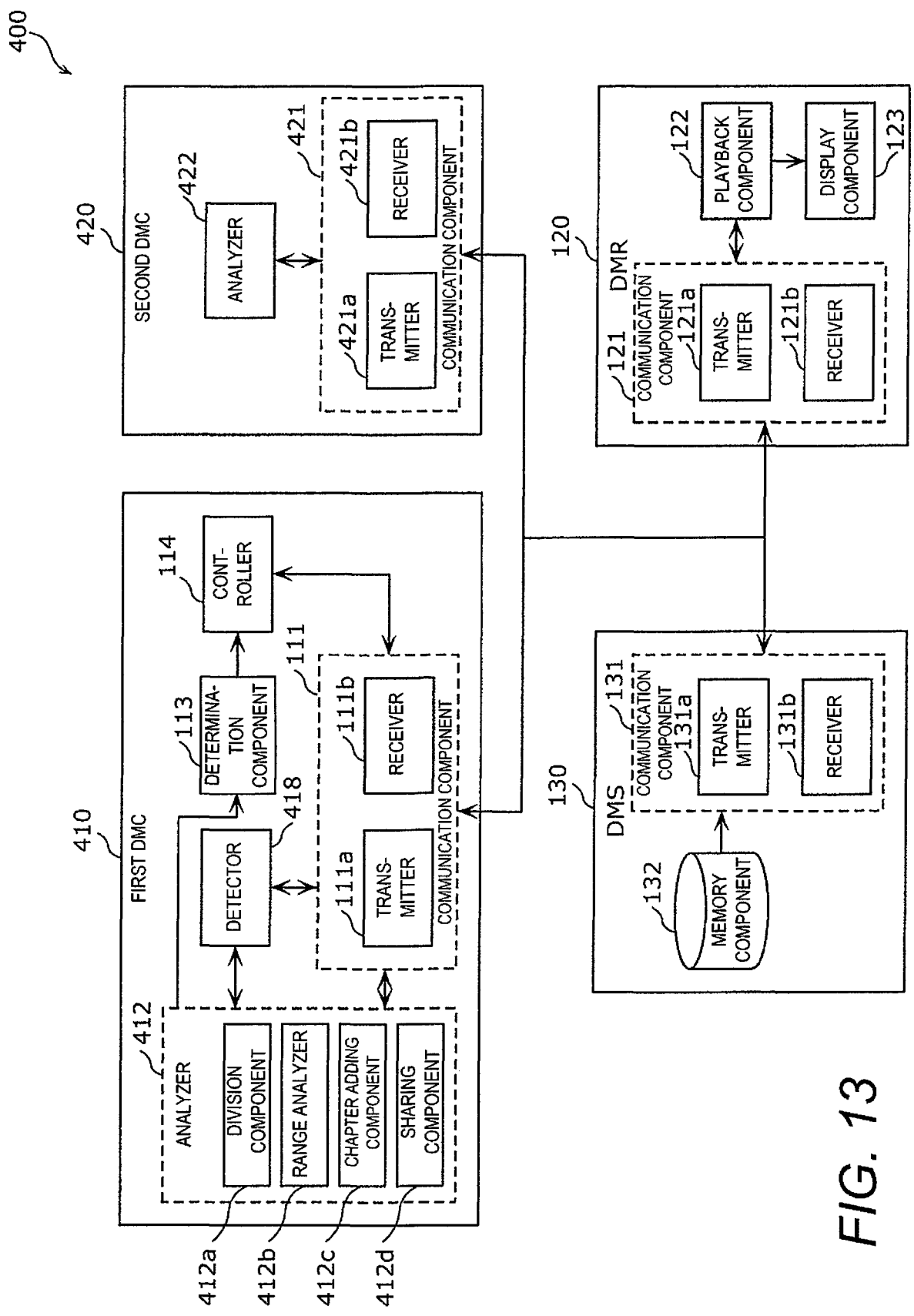
FIG. 13 is a block diagram of the functional configuration of a content playback system in a fourth embodiment.

FIG. 13 is a block diagram of the functional configuration of the content playback system in the fourth embodiment. In FIG. 13, those components that are the same as or similar to those in FIG. 2 are numbered the same and may not be described again.

In this embodiment, a content playback system 400 is a system that conforms to DLNA guidelines, just as in the first embodiment, and comprises a first DMC 410, a second DMC 420, the DMR 120, and the DMS 130, which are connected to each other via a communications network.

The first DMC 410 is an example of a control apparatus that controls the playback of video content in a playback device (here, the DMR 120). The first DMC 410 is, for example, a smart phone, a tablet computer, or a personal computer.

The second DMC 420 is an example of a device used for distributed processing in the analysis of video content. The second DMC 420 is, for example, a smart phone, a tablet computer, or a personal computer. "Distributed processing" means that a single processing job is divided up among a plurality of devices.

The detailed configuration of the first DMC 410 and second DMC 420 included in the content playback system 400 will now be described.

Configuration of First DMC

The first DMC 410 comprises the communication component 111, an analyzer 412, a detector 418, the determination component 113, and the controller 114.

The detector 418 detects one or more devices for the distributed processing of the analysis of video content on a communications network. For instance, the detector 418 detects one or more devices for distributed processing based on a notification message received from a device when that device has joined a communications network. Also, for example, the detector 418 can detect one or more devices for distributed processing by asking the devices on a communications network about a service that is executable by multicast.

The analyzer 412 analyzes video content by distributed processing with the one or more devices detected by the detector 418. More specifically, the analyzer 412 comprises a division component 412a, a range analyzer 412b, a chapter adding component 412c, and a sharing component 412d.

The division component 412a divides up the video content according to the number of the one or more devices detected by the detector 418, and thereby determines a plurality of analysis ranges including a first analysis range and a second analysis range. For example, if the number of the one or more devices detected by the detector 418 is one, the division component 412a divides the video content in two, and determines two analysis ranges. More specifically, the division component 412a temporally divides up a video content of 1200 seconds, for example, and determines the first analysis range and second analysis range to be 0 to 600 seconds and 600 to 1200 seconds, respectively.

The range analyzer 412b is notified of the first analysis range thus determined. Also, the second analysis range is sent by the transmitter 111a to the second DMC 420, which is one of the one or more devices detected by the detector 418. As a result, the analysis result for the second analysis range is received by the receiver 111b from the second DMC 420.

The range analyzer 412b analyzes video content over the first analysis range. More specifically, the range analyzer 412b detects a specific segment from the part of the video content specified by the first analysis range.

The chapter adding component 412c corresponds to a chapter detector, and assigns or adds chapters to the video content based on the analysis result for the first analysis range produced by the range analyzer 412b and the analysis result for the second analysis range produced by the second DMC 420. For example, the chapter adding component 412c assigns or adds a chapter to the start position and end position of a first specific segment indicating the analysis result for the first analysis range, and to the start position and end position of a second specific segment indicating the analysis result for the second analysis range.

The sharing component 412d shares the analysis result for the first analysis range produced by the range analyzer 412b and the analysis result for the second analysis range produced by the second DMC 420 between the first DMC 410 and the second DMC 420. For example, the sharing component 412d sends the analysis result for the first analysis range via the transmitter 111a to the second DMC 420. Consequently, the analysis result for the first analysis range and the analysis result for the second analysis range are shared between the first DMC 410 and the second DMC 420. Chapters assigned or added based on the analysis result for the first analysis range and the analysis result for the second analysis range can also be shared.

Configuration of Second DMC

The second DMC 420 comprises at least a communication component 421 and an analyzer 422. In the illustrated embodiment, although not shown in FIG. 13, the second DMC 420 can include the same configurations as the first DMC 410 such that the second DMC 420 can control the playback of the video content in the playback device (here, the DMR 120). In other words, in the illustrated embodiment, the first DMC 410 can include the same configurations as the second DMC 420 for performing the distributed processing in the analysis of the video content.

The communication component 421 comprises a transmitter 421a that transmits information to the first DMC 410, the DMR 120, and the DMS 130, and a receiver 421b that receives information from the first DMC 410, the DMR 120, and the DMS 130. For example, the communication component 421 is realized by a network adapter for communicating with devices on a communications network.

The receiver 421b receives information about the second analysis range from the first DMC 410 and outputs it to the analyzer 422. The receiver 421b also receives video content from the DMS 130.

The transmitter 421a sends the first DMC 410 the analysis result for the second analysis range produced by the analyzer 422.

The analyzer 422 analyzes the video content over the second analysis range. More specifically, the analyzer 422 detects a specific segment from the part of the video content specified by the second analysis range, for example.

Operation of Content Playback system

Figure 14:
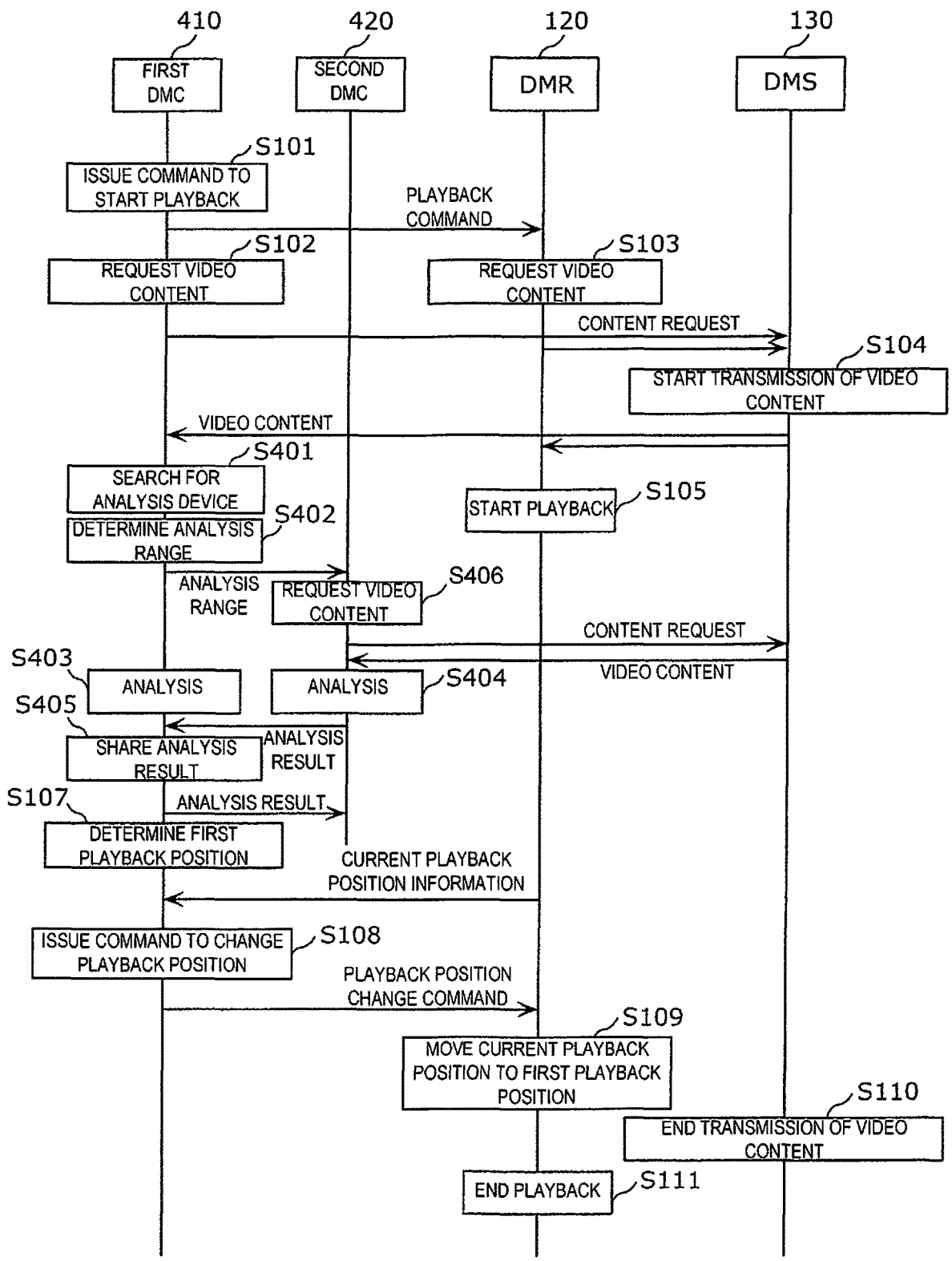
FIG. 14 is a sequence diagram of the operation of the content playback system in the fourth embodiment.

The operation of the content playback system 400 configured as above will now be described through reference to FIG. 14. FIG. 14 is a sequence diagram of the operation of the content playback system in the fourth embodiment. In FIG. 14, those components that are the same as or similar to those in FIG. 3 are numbered the same and may not be described again.

The detector 418 of the first DMC 410 searches the communications network and detects one or more devices for the distributed processing of the analysis of video content (S401).

The analyzer 412 of the first DMC 410 divides up the video content and determines a plurality of analysis ranges including a first analysis range and a second analysis range (S402). Information about the second analysis range thus determined is sent to the second DMC 420.

The analyzer 412 of the first DMC 410 analyzes the video content over the first analysis range (S403).

In response to receiving the information about the second analysis range, the analyzer 422 of the second DMC 420 requests of the DMS 130 the transmission of video content (S406). More specifically, the second DMC420 sends a control message (content request) requesting the transmission of video content to the DMS 130. In response to receiving the video content from the DMS 130, the analyzer 422 of the second DMC 420 analyzes the video content over the second analysis range (S404). The analysis result for the second analysis range is sent to the first DMC 410.

The analyzer 412 of the first DMC 410 shares the analysis result for the video content with the second DMC 420 (S405). Consequently, the analysis result for the first analysis range is sent to the second DMC 420.

The determination component 113 of the first DMC 410 determines the first playback position based on the analysis result for the video content (S107).

Effect

As discussed above, with the content playback system 400 pertaining to this embodiment, the analysis processing of the video content can be done by distributed processing. Therefore, there is less burden on the first DMC 410, and the distributed processing speed can be increased.

Also, with the content playback system 400 pertaining to this embodiment, the result of analysis by distributed processing can be shared between the devices that have performed the analysis. Specifically, the transmitter 111a of the first DMC 410 can transmit the analysis result for the first analysis range produced by the range analyzer 412b to the second DMC 420 (e.g., one of the one or more devices) such that the second DMC 420 controls the playback of the content at the DMR 120 (e.g., playback device). In particular, in this case, a determination component of the second DMC 420 determines the first playback position based on the analysis result for the first analysis range by the first DMC 410 and the analysis result for the second analysis range by the second DMC 420. Therefore, if, for example, the first DMC 410 cannot be connected to a communications network, the second DMC 420 can perform playback control instead of the first DMC 410, which improves the reliability of the content playback system 400.

Other Embodiments

The control apparatus pertaining to one or more modes of the present invention is described based on embodiments above, but the present invention is not limited to or by these embodiments. As long as there is no departure from the gist of the present invention, a mode in which any of various modifications that could be imagined by a person skilled in the art are applied to these embodiments, and a mode in which the constituent elements of different embodiments are combined, can also be included in the scope of one or more modes of the present invention.

For instance, in each of the above embodiments, the content playback system is one that conformed to DLNA guidelines, but it does not necessarily have to conform to DLNA guidelines. For example, the content playback system can conform to standards other than DLNA guidelines.

Also, in the second embodiment above, information about chapters is displayed as with the chapter marks 2002 in FIG. 8, but chapter information does not necessarily have to be displayed. If no chapter information is displayed, the DMC 210 need not comprise the analyzer 212.

Also, in the second embodiment above and its modification examples, the GUI shown in FIGS. 8 to 11 is just an example, and this GUI is not the only option. For example, radio buttons or check boxes can be used instead of the first button 2005 and the second button 2006. Also, the second playback position can be determined to always be the first playback position, regardless of user operation. Also, a drop-down list or a spin button for selecting information about a plurality of chapters can be used instead of a slider or a thumbnail image.

Also, in the first embodiment above, a segment that satisfied conditions for detecting a CM segment is described as an example of a segment (specific segment) that satisfies a predetermined condition, but the specific segment is not limited to this. For instance, the specific segment can be a segment that is defined ahead of time by a length of time, such as the first five seconds of the video content.

Also, the plurality of constituent elements comprised by the DMC in the embodiments above can be realized by a plurality of dedicated circuits, or can be realized by a single system LSI (large-scale integrated circuit). Also, the plurality of constituent elements comprised by the DMC can be realized by using a processor to execute a software program or instructions stored in a non-temporary memory.

A system LSI is a super multifunctional LSI, and includes a computer system made up of a microprocessor, a ROM (read only memory), a RAM (random access memory), and the like, for example. In this case, a computer program is stored in the ROM. The microprocessor operates according to a computer program, allowing the system LSI to achieve its functions.

The term "system LSI" is used here, but depending on the degree of integration, it can instead be called an IC, LSI, super-LSI, or ultra-LSI. Also, the method for circuit integration is not limited to LSI, and can instead be realized by a universal processor or a dedicated circuit. An FPGA (field programmable gate array), which can be programmed after LSI manufacture, or a configurable processor that allows for the configuration of settings or connections of circuit cells within the LSI, can also be used.

Furthermore, if advances in semiconductor technology or another derivative technology should yield a circuit integration technique that supplants LSI, naturally, that technique can be used to integrate functional blocks. It is also conceivable that the application of biotechnology or the like can be possible.

Also, a mode of the present invention may be not only this control apparatus, but also a control method whose steps consist of the characteristic constituent elements included in the control apparatus. Also, a mode of the present invention can be a computer program that causes a computer to execute the characteristic steps included in a control method. Also, a mode of the present invention can be a non-temporary recording medium in which this computer program is recorded and which can be read by a computer.

In the embodiments given above, the various constituent elements can be made up of dedicated hardware (electronic circuits), or by executing a software program suited to those constituent elements. Also, the constituent elements can be realized by a combination of software and hardware. For example, the analyzer 112, the determination component 113, and the controller 114 in FIG. 2 can be realized by one or more CPUs, one or more processors, or another such program execution component. Specifically, the analyzer 112, determination component 113, and controller 114 in FIG. 2 can be realized by having the one or more CPUs, the one or more processors, or another such program execution component execute a software program recorded to a non-temporary recording medium such as a hard disk or a semiconductor memory. Similarly, the analyzer 212, the playback component 215, the determination component 213, and the controller 214 in FIG. 5 can be realized by one or more CPUs, one or more processors, or another such program execution component. Also, the playback component 315, the determination component 313, and the controller 314 in FIG. 12 can be realized by one or more CPUs, one or more processors, or another such program execution component. Also, the analyzer 412, the detector 418, the determination component 113, and the controller 114 in FIG. 13 can be realized by one or more CPUs, one or more processors, or another such program execution component. Also, the analyzer 422 in FIG. 13 can be realized by one or more CPUs, one or more processors, or another such program execution component.

A plurality of devices on a communications network can be used as a content playback system for playing video content.

[1] In view of the state of the known technology and in accordance with a first aspect of the present invention, a control apparatus is configured to be connected to a server device storing content and to a playback device, and is configured to control playback of the content at the playback device. The control apparatus comprises a receiver, and a controller. The receiver is configured to receive the content from the server device. The controller is configured to transmit to the playback device information about a first playback position in the content received by the receiver.

With this configuration, the control apparatus can transmit to the playback device the information about the first playback position, which is the destination playback position, based on the content received from the server device. Therefore, the control apparatus can transmit the information about the first playback position that is suited to the content, and the playback of the content via a communications network can be controlled effectively. In particular, since it is the control apparatus and not the server device that transmits the information about the first playback position, no special processing is needed for the first playback position. Therefore, a mode of the present invention can be easily applied to a system that conforms to DLNA guidelines. Furthermore, since there is no need for the playback device to detect the first playback position, the playback position can be changed to the first playback position with no problem, even if the playback device has low processing capacity. Therefore, even a television receiver with low processing capacity or the like is utilized as the playback device, the playback of the content at the playback device can be controlled effectively.

[2] In accordance with a preferred embodiment according to the control apparatus mentioned above, the control apparatus can further comprise an analyzer configured to analyze at least one of video and audio of the content received by the receiver to detect a position of a chapter in the content, and a determination component configured to determine the first playback position based on the position of the chapter detected by the analyzer.

With this configuration, the control apparatus can analyze the content and determine the first playback position based on this analysis result. Therefore, the control apparatus can determine the first playback position that is better suited to the content, and the playback of the content via the communications network can be controlled more effectively.

[3] In accordance with a preferred embodiment according to any one of the control apparatuses mentioned above, the chapter includes a first chapter and a second chapter. The analyzer is configured to detect a start position and and end position of a segment that satisfies a predetermined condition in the content as a position of the first chapter and a position of the second chapter. The controller is configured to transmit to the playback device the position of the second chapter as the information about the first playback position when information about a playback position of the content at the playback device received by the receiver matches the position of the first chapter.

With this configuration, the start position and the end position of the segment that satisfies the predetermined condition in the content can be detected as the position of the first chapter and the position of the second chapter. When the playback position of the content in the playback device reaches the position of the first chapter, a control message can be transmitted to the playback device to move the playback position of the content in the playback device to the first playback position (the position of the second chapter). Therefore, the content can be played by automatically skipping the segment that satisfies the predetermined condition, so the playback of the content at the playback device can be controlled effectively.

[4] In accordance with a preferred embodiment according to any one of the control apparatuses mentioned above, the control apparatus further comprises an input component, a playback component, and a display component. The input component is configured to be operated to designate a second playback position in the content. The playback component is configured to play the content from the second playback position. The display component is configured to display the content played from the second playback position by the playback component. The controller is configured to transmit to the playback device the information about the first playback position based on the content played from the second playback position by the playback component.

With this configuration, the display component of the control apparatus can display the content played from the second playback position, and the information about the first playback position can be transmitted to the playback device based on this content. Therefore, the user can determine the first playback position while watching the content displayed on the control apparatus. That is, the user can determine the first playback position from just the control apparatus, without having to look at both the control apparatus and the playback device. This makes the system easier to operate for the user, and allows the playback of the content at the playback device to be controlled effectively.

[5] In accordance with a preferred embodiment according to any one of the control apparatuses mentioned above, the control apparatus further comprises an analyzer configured to analyze at least one of video and audio of the content to detect a position of one or more chapters in the content, and the display component is further configured to display information about the detected position of the one or more chapters.

With this configuration, the information about the one or more chapters detected by the analyzer can be displayed. Therefore, the user can look at the displayed information about the one or more chapters in order to designate the second playback position properly, which makes the system easier to operate for the user.

[6] In accordance with a preferred embodiment according to any one of the control apparatuses mentioned above, the analyzer is configured to detect a start position and an end position of a segment that satisfies a predetermined condition in the content as the position of the one or more chapters.

With this configuration, the position of the one or more chapters can include the start position and the end position of the segment that satisfies the predetermined condition in the content. Therefore, the user can look at the information about the chapter in order to ascertain the segment that satisfies the predetermined condition. As a result, the second playback position can be properly designated, and the playback of the content at the playback device can be controlled effectively.

[7] In accordance with a preferred embodiment according to any one of the control apparatuses mentioned above, the analyzer is configured to detect a position in the content where video or audio is changed as the position of the one or more chapters.

With this configuration, the position of the one or more chapters can include the position in the content where video or audio is switched. Therefore, the user can look at the information about the chapter in order to ascertain the position where video or audio is switched. As a result, the second playback position can be properly designated, and the playback of the content at the playback device can be controlled effectively.

[8] In accordance with a preferred embodiment according to any one of the control apparatuses mentioned above, the position of the one or more chapters includes periodic positions at a predetermined time interval.

With this configuration, the position of the one or more chapters can include the periodic positions at the predetermined time interval. Therefore, the user can look at the information about the chapter to ascertain the position in the content. As a result, the second playback position can be properly designated, and the playback of the content at the playback device can be controlled effectively.

[9] In accordance with a preferred embodiment according to any one of the control apparatuses mentioned above, the display component is further configured to display a movable indicator for designating the second playback position, with the second playback position being designated by moving the indicator to a position corresponding to the second playback position. Thus, an operation to designate the second playback position is an operation to move the indicator to the position corresponding to the second playback position.

With this configuration, the second playback position can be designated by the operation to move the indicator to the position corresponding to the second playback position. Therefore, the second playback position can be designated with ease.

[10] In accordance with a preferred embodiment according to any one of the control apparatuses mentioned above, the analyzer is configured to produce one or more images corresponding to the one or more chapters, and information about the one or more chapters includes the one or more images.

With this configuration, the one or more images corresponding to the one or more chapters can be displayed. Therefore, the user can easily designate the second playback position based on the displayed one or more images.

[11] In accordance with a preferred embodiment according to any one of the control apparatuses mentioned above, the one or more images include a plurality of images, and when the input component is operated to designate one of the images, the display component is configured to display the content played from the second playback position by the playback component in a region that is larger than a display region of the designated image, and is configured to reduce the size of a display region of the rest of the images.

With this configuration, when there is a user operation to designate a first image, the content played from the second playback position by the playback component can be displayed in the region that is larger than the display region of the first image, and a display region of a second image can be reduced. Therefore, the played content can be displayed larger, which makes the content easier to view.

[12] In accordance with a preferred embodiment according to any one of the control apparatuses mentioned above, the input component is further configured to be operated to select one of the second playback position and the playback position of the content by the playback component as the first playback position.

With this configuration, the first playback position can be determined to be whichever is selected from among the second playback position and the playback position of the content by the playback component. Therefore, the user can determine the first playback position according to the content played from the second playback position, and the playback of the content at the playback device can be controlled effectively.

[13] In accordance with a preferred embodiment according to any one of the control apparatuses mentioned above, the control apparatus further comprises a detector configured to detect one or more devices to perform distributed processing for an analysis of the content on a communications network, and the analyzer is configured to analyze the at least one of video and audio of the content by the distributed processing with the one or more devices detected by the detector.

With this configuration, the content analysis processing can be performed by the distributed processing. Therefore, the burden on the control apparatus can be reduced, and analysis processing speed can be increased.

[14] In accordance with a preferred embodiment according to any one of the control apparatuses mentioned above, the analyzer includes a division component that is configured to determine a plurality of analysis ranges including a first analysis range and a second analysis range by dividing up the content according to the number of the one or more devices detected by the detector, and a range analyzer that is configured to analyze the at least one of video and audio of the content in the first analysis range. The control apparatus further comprises a transmitter configured to transmit information about the second analysis range to one of the one or more devices. The receiver is further configured to receive an analysis result for the second analysis range from the one of the one or more devices. The analyzer further includes a chapter detector that is configured to detect a chapter in the content based on the analysis result for the first analysis range produced by the range analyzer and the analysis result for the second analysis range produced by the one of the one or more devices.

With this configuration, the chapters can be added to the content based on the analysis results for a plurality of analysis ranges.

[15] In accordance with a preferred embodiment according to any one of the control apparatuses mentioned above, the analyzer further includes a sharing component with which the analysis result for the first analysis range produced by the analyzer and the analysis result for the second analysis range produced by the one of the one or more devices are shared by the control apparatus and the one of the one or more devices.

With this configuration, the analysis result obtained by the distributed processing can be shared among the devices performing the analysis. Therefore, if the control apparatus cannot be connected to a communications network, for example, another device can perform playback control in place of the control apparatus, which makes the system more reliable.

[16] In accordance with a preferred embodiment according to any one of the control apparatuses mentioned above, the control apparatus further comprises a playback component, a display component, and a determination component. The playback component is configured to play the content. The display component is configured to display the content played by the playback component. The determination component is configured to determine the first playback position. The controller is further configured to synchronize the playback of the content at the playback device with the playback of the content by the playback component. The determination component is further configured to determine the first playback position based on the content played by the playback component. Also, the controller can also be configured to transmit to the playback device information about the first playback position based on the content played by the playback component.

With this configuration, the playback of the content at the playback device can be synchronized with the playback of the content by the playback component. Also, the user can determine the first playback position while looking at the content displayed on the control apparatus. That is, the user can determine the first playback position from just the control apparatus, without having to look at both the control apparatus and the playback device. This makes the system easier to operate for the user, and allows the playback of the content at the playback device to be controlled effectively.

[17] In accordance with a preferred embodiment according to any one of the control apparatuses mentioned above, the content includes first audio in a first language and second audio in a second language, the playback device is configured to play the first audio, and the playback component is configured to play the second audio.

With this configuration, the first audio in the first language can be played by the playback device, and the second audio in the second language can be played by the control apparatus. Therefore, the viewer of the playback device and the user of the control apparatus can listen to audio in different languages, which makes the system more convenient for the user.

[18] In accordance with a preferred embodiment according to any one of the control apparatuses mentioned above, the content includes first video and second video, the playback device is configured to play the first video, and the playback component is configured to play the second video. For example, the content can be multiview video content that includes the first video and the second video.

With this configuration, the first video can be played by the playback device, and the second video can be played by the control apparatus. Therefore, the viewer of the playback device and the user of the control apparatus can watch video in different views, which makes the system more convenient for the user.

[19] In accordance with a preferred embodiment according to any one of the control apparatuses mentioned above, the control apparatus is configured to function as a digital media controller that conforms to DLNA (Digital Living Network Alliance) guidelines.

With this configuration, a mode of the present invention can be applied to a system that conforms to DLNA guidelines.

[20] In accordance with a preferred embodiment according to any one of the control apparatuses mentioned above, the transmitter is further configured to transmit the analysis result for the first analysis range produced by the range analyzer to the one of the one or more device such that the one of the one or more device controls the playback of the content at the playback device.

These inclusive or specific modes can be realized by a system, a method, an integrated circuit, a computer program, or a computer-readable CD-ROM or other such recording medium, or can be realized by a suitable combination of systems, methods, integrated circuits, computer programs, and recording media.

The control apparatus pertaining to a mode of the present invention can effectively control the playback of the content (video content) via the communications network.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A control apparatus that is connected to a server device storing content and to a playback device, and controls playback of the content at the playback device, the control apparatus comprising:
    a receiver that receives the content from the server device;
    an analyzer that process at least one of video and audio of the content received by the receiver to determine a position of a chapter in the content;
    a determination component that determines a first playback position in the content based on the position of the chapter determined by the analyzer; and
    an electric controller that transmits to the playback device information about the first playback position in the content,
    the controller transmitting to the server device a content request for requesting the server device to send the content to the control apparatus in response to transmitting a playback instruction to the playback device to play the content at the playback device,
    the receiver receiving the content from the server device in parallel to the playback device receiving the content from the server device without going through the control apparatus in response to the playback instruction from the control apparatus,
    the analyzer processing the at least one of the video and audio of the content that has been received in response to the controller transmitting the content request to determine the position of the chapter in the content in parallel to the playback device playing the content that has been received from the server device without going through the control apparatus in response to the playback instruction from the control apparatus,
    the chapter including a first chapter and a second chapter,
    the analyzer detecting a start position and an end position of a segment that satisfies a predetermined condition in the content as a position of the first chapter and a position of the second chapter, and
    the controller transmitting to the playback device the position of the second chapter as the information about the first playback position when information about a playback position of the content at the playback device received by the receiver matches the position of the first chapter.

2. A control apparatus that is connected to a server device storing content and to a playback device, and controls playback of the content at the playback device, the control apparatus comprising:
    a receiver that receives the content from the server device;
    an analyzer that process at least one of video and audio of the content received by the receiver to simultaneously display a plurality of selectable images of the content on a display, the selectable images corresponding to positions of chapters in the content;
    a determination component that determines a first playback position in the content based on a user selection of one of the selectable images of the content displayed on the display by the analyzer; and
    an electric controller that receives information about a current playback position of the content at the playback device from the playback device and transmits to the playback device information indicating the first playback position in the content based on the information about the current playback position of the content at the playback device,
    the controller transmitting to the server device a content request for requesting the server device to send the content to the control apparatus in response to transmitting a playback instruction to the playback device to play the content at the playback device,
    the receiver receiving the content from the server device in parallel to the playback device receiving the content from the server device without going through the control apparatus in response to the playback device transmitting a content request of the content to the server device when the playback device receives the playback instruction from the control apparatus, and
    the analyzer processing the at least one of the video and audio of the content that has been received in response to the controller transmitting the content request in parallel to the playback device playing the content that has been received from the server device without going through the control apparatus in response to the playback device transmitting the content request of the content to the server device when the playback device receives the playback instruction from the control apparatus.

3. The control apparatus according to claim 2, further comprising
    an input component that is operated to designate a second playback position in the content, and
    a playback component that plays the content from the second playback position,
    the display displaying the content played from the second playback position by the playback component,
    the controller transmitting to the playback device the information indicating the first playback position based on the content played from the second playback position by the playback component.

4. The control apparatus according to claim 3, wherein
    the analyzer processes the at least one of video and audio of the content to determine the position of the chapters in the content,
    the display displays information about the detected positions of the chapters.

5. The control apparatus according to claim 4, wherein the analyzer detects a start position and an end position of a segment that satisfies a predetermined condition in the content as the positions of the chapters.

6. The control apparatus according to claim 4, wherein the analyzer detects positions in the content where video or audio is changed as the positions of the chapters.

7. The control apparatus according to claim 4, wherein the positions of the chapters include periodic positions at a predetermined time interval.

8. The control apparatus according to claim 4, wherein the analyzer produces the selectable images corresponding to the chapters, and
the information about the detected positions of the chapters includes the selectable images.

9. The control apparatus according to claim 8, wherein when the input component is operated to designate one of the selectable images, the display displays the content played from the second playback position by the playback component in a region that is larger than a display region of the designated selectable image, and reduces the size of a display region of the rest of the selectable images.

10. The control apparatus according to claim 3, wherein the display displays a movable indicator for designating the second playback position, with the second playback position being designated by moving the indicator to a position corresponding to the second playback position.

11. The control apparatus according to claim 3, wherein the input component is operated to select one of the second playback position and the current playback position of the content by the playback component as the first playback position.

12. The control apparatus according to claim 2, further comprising
a detector detects one or more devices to perform distributed processing for an analysis of the content on a communications network, and
the analyzer analyzes the at least one of video and audio of the content by the distributed processing with the one or more devices detected by the detector.

13. The control apparatus according to claim 12, wherein the analyzer includes
a division component that determines a plurality of analysis ranges including a first analysis range and a second analysis range by dividing up the content according to the number of the one or more devices detected by the detector, and
a range analyzer that analyzes the at least one of video and audio of the content in the first analysis range,
the control apparatus further comprises a transmitter that transmits information about the second analysis range to one of the one or more devices,
the receiver receives an analysis result for the second analysis range from the one of the one or more devices, and
the analyzer further includes a chapter detector that detects a chapter in the content based on the analysis result for the first analysis range produced by the range analyzer, and the analysis result for the second analysis range produced by the one of the one or more devices.

14. The control apparatus according to claim 13, wherein the analyzer further includes a sharing component with which the analysis result for the first analysis range produced by the analyzer and the analysis result for the second analysis range produced by the one of the one or more devices are shared by the control apparatus and the one of the one or more devices.

15. The control apparatus according to claim 14, wherein the transmitter transmits the analysis result for the first analysis range produced by the range analyzer to the one of the one or more devices such that the one of the one or more devices controls the playback of the content at the playback device.

16. The control apparatus according to claim 2, further comprising
a playback component that plays the content,
the display displaying the content played by the playback component,
the controller synchronizing the playback of the content at the playback device with the playback of the content by the playback component.

17. The control apparatus according to claim 16, wherein the content includes first audio in a first language and second audio in a second language,
the playback device plays the first audio, and
the playback component plays the second audio.

18. The control apparatus according to claim 16, wherein the content includes first video and second video,
the playback device plays the first video, and
the playback component plays the second video.

19. The control apparatus according to claim 2, wherein the control apparatus functions as a digital media controller that conforms to DLNA (Digital Living Network Alliance) guidelines.

20. The control apparatus according to claim 2, wherein the analyzer process the at least one of video and audio of the content received by the receiver to determine periodic positions of chapters at a predetermined time interval.

* * * * *